US012644764B2

(12) United States Patent
Qi et al.

(10) Patent No.: US 12,644,764 B2
(45) Date of Patent: Jun. 2, 2026

(54) OPTICAL RECEIVING DEVICE AND OPTICAL SENSING DEVICE

(71) Applicant: SUTENG INNOVATION TECHNOLOGY CO., LTD., Shenzhen (CN)

(72) Inventors: Zhihong Qi, Shenzhen (CN); Ying Yang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 244 days.

(21) Appl. No.: 18/368,548

(22) Filed: Sep. 14, 2023

(65) Prior Publication Data

US 2024/0003739 A1     Jan. 4, 2024

Related U.S. Application Data

(63) Continuation of application No. 18/072,653, filed on Nov. 30, 2022, now Pat. No. 11,796,385.

(30) Foreign Application Priority Data

| Dec. 3, 2021 | (CN) | ......................... 202111472547.8 |
| Dec. 3, 2021 | (CN) | ......................... 202111479452.9 |
| Dec. 14, 2021 | (CN) | ......................... 202111525513.0 |

(51) Int. Cl.
| *G01J 1/04* | (2006.01) |
| *G01S 7/481* | (2006.01) |
| *G01J 1/42* | (2006.01) |

(52) U.S. Cl.
CPC ........... *G01J 1/0411* (2013.01); *G01S 7/4811* (2013.01); *G01J 1/0403* (2013.01); *G01J 1/0477* (2013.01); *G01J 1/42* (2013.01)

(58) Field of Classification Search
CPC ...... G01J 1/0403; G01J 1/0411; G01J 1/0477; G01J 1/42; G01S 7/4811
See application file for complete search history.

(56) References Cited

U.S. PATENT DOCUMENTS

2014/0110570 A1     4/2014  Morioka et al.
2021/0349187 A1 *  11/2021  Hu ......................... G01S 7/4817

FOREIGN PATENT DOCUMENTS

| CN | 107132519 A | 9/2017 |
| CN | 111812664 A | 10/2020 |
| CN | 112219130 A | 1/2021 |
| CN | 112230234 A | 1/2021 |

* cited by examiner

*Primary Examiner* — Kevin K Pyo
(74) *Attorney, Agent, or Firm* — BAYES PLLC

(57)     ABSTRACT

The present application discloses an optical receiving device, including: a receiving sensor; an optical assembly arranged on a side where a photosensitive surface of the receiving sensor is located. The optical assembly includes a first prism having a first end surface, a second end surface, and a plurality of sides connected between the first end surface and the second end surface. The plurality of sides include a first side and a second side. At least a portion of laser signals reflected by a detecting target is refracted by the first side and enter the first prism. At least a portion of laser signals refracted by the first side is refracted by the second side and emitted from the first prism to reach the receiving sensor.

9 Claims, 21 Drawing Sheets

----- Echo signals of close-range detecting target

—— — Echo signals of long-range detecting target

OPTICAL RECEIVING DEVICE AND OPTICAL SENSING DEVICE

CROSS-REFERENCE TO RELATED APPLICATIONS

The present application is a continuation of application Ser. No. 18/072,653, filed on Nov. 30, 2022, which claims the benefit of priority to China Patent Application No. CN202111472547.8, filed on Dec. 3, 2021, China Patent Application No. CN202111479452.9, filed on Dec. 3, 2021, and China Patent Application No. CN202111525513.0, filed on Dec. 14, 2021, the contents of which are incorporated herein by reference in their entireties.

TECHNICAL FIELD

The present application relates to the technical field of optical sensing, and in particular, to an optical receiving device and an optical sensing device.

BACKGROUND

An optical sensing device is a device capable of converting optical signals into electric signals. The optical sensing device generally includes an optical emitting device and an optical receiving device. A light source in the optical emitting device emits a detecting light beam to a target object. The optical receiving device receives a detecting echo light beam reflected from the target object and outputs corresponding electric signals. After a control portion in the optical sensing device processes the electric signals, distance, azimuth, altitude, speed, attitude, shape, and other parameters of the target object can be obtained, thereby realizing a detecting function.

However, when the distance of the target object is measured, the detecting echo light beam reflected back from the target object needs to be processed by the lens assembly in the optical receiving device and transmitted to the photosensitive member. In order to meet the detecting needs of a system at a long distance, when the target object is closer to the target object, the detecting echo light beam is shifted when passing through the lens assembly, which can result in a large number of detecting echo light beams not being detected and received by an optical sensor, resulting in a weaker intensity of the detecting light signals received by the optical sensing device.

SUMMARY

The present application provides an optical receiving device and an optical sensing device, which can solve the problem that detecting light signals received by the optical sensing device are weak in intensity.

In a first aspect, an embodiment of the present application provides an optical receiving device, including:

a lens assembly including at least one lens;

a reflecting member located on a transmission path of light passing through the lens assembly, the reflecting member having a reflecting surface for reflecting the light passing through the lens assembly; and a photosensitive member having a photosensitive surface for receiving light reflected by the reflecting surface.

In some embodiments of the present application, the reflecting surface is an inner concave surface. The reflecting surface can be recessed to form a concave-surface reflecting structure. After divergent light is directed to the concave-surface reflecting structure, light reflected by the reflecting surface can be focused via the reflection action of the concave-surface reflecting structure, so that the light reflected by the reflecting surface is focused on the photosensitive surface of the photosensitive member. Therefore, most of the detecting echo light beams are detected and received by the photosensitive member.

In some embodiments of the present application, the reflecting surface is an inner concave curved surface. Compared with the concave-surface reflecting structure consisting of a plurality of reflecting planes, the concave-surface reflecting structure consisting of the plurality of reflecting planes generally has a plurality of focal points, and a concave-surface reflecting structure consisting of smooth curved surfaces can take a photosensitive surface of the photosensitive member as one focal point of the concave-surface reflecting structure, so that the detecting echo light beams reflected from a plurality of positions are reflected onto the photosensitive surface after being reflected by the reflecting surface, which can improve the intensity of the detecting light signals at various positions within a preset distance received by the optical sensing device and enhance the detecting effect of the optical sensing device.

In some embodiments of the present application, the reflecting surface has a first focal point and a second focal point. Light passing through the first focal point and transmitted to the reflecting surface is reflected by the reflecting surface and then focused in the second focal point. The first focal point coincides with an exit pupil center of the lens assembly. The second focal point is located on the photosensitive surface of the photosensitive member. The first focal point of the reflecting surface is coincidently arranged with the exit pupil center of the lens assembly. The second focal point can be located on the photosensitive surface of the photosensitive member, so that the detecting echo light beam reflected from the target object, after passing through the lens assembly and being reflected by the reflecting surface, is focused onto the photosensitive surface, which can further improve the intensity of the detecting light signals received by the optical sensing device.

In some embodiments of the present application, the second focal point of the reflecting surface is located in a center of the photosensitive surface. The second focal point of the reflecting surface is coincidently arranged with the center of the photosensitive surface. More light can be transmitted to the photosensitive surface without changing an area of the photosensitive surface, which can improve the intensity of the detected light signals received by the optical sensing device.

In some embodiments of the present application, the reflecting surface is a circular arc surface. The circular arc reflecting surface can enable the detecting echo light beam reflected from the target object to be focused onto the photosensitive surface after passing through the lens assembly and being reflected by the reflecting surface, thereby increasing the intensity of the detecting light signals received by the optical sensing device.

In some embodiments of the present application, the reflecting surface is an elliptical arc surface. The elliptical arc reflecting surface can enable the detected echo light beam reflected from the target object to be focused onto the photosensitive surface after passing through the lens assembly and being reflected by the reflecting surface, thereby increasing the intensity of the detecting light signals received by the optical sensing device.

In some embodiments of the present application, the reflecting surface is a plane. Relative to the concave-surface reflecting structure, although the focusing effect of the plane-reflecting structure is slightly worse, the plane-reflecting structure is easier to form, and the production cost of the reflecting member can be reduced under the premise that the intensity of the detecting light signals received by the optical sensing device is sufficient.

In some embodiments of the present application, the photosensitive surface of the photosensitive member is arranged in parallel to an optical axis of the lens assembly. The reflecting surface is arranged obliquely relative to the photosensitive surface. The above design facilitates the placement of the lens assembly, the reflecting member, and the photosensitive member in the optical sensing device, which is conducive to reducing assembly cost and improving a space utilization rate.

In a second aspect, the present application also provides an optical sensing device, including an optical emitting device and the optical receiving device according to any one of the above embodiments. The optical emitting device is configured to emit a detecting light beam to a target object, and the optical receiving device is configured to receive a detecting echo light beam reflected back from the target object.

In a third aspect, the present application provides an optical receiving device, including:
 a lens assembly including at least one lens;
 a reflecting member located on a transmission path of light passing through the lens assembly, the reflecting member having a reflecting surface for reflecting the light passing through the lens assembly; and
 a photosensitive member having a photosensitive surface for receiving light reflected by the reflecting surface.

The reflecting surface includes a first portion and a second portion. The second portion is arranged along an outer boundary of the first portion. The first portion has a reflectivity greater than that of the second portion;

A spacing between a first preset position of the first portion and the optical axis of the lens assembly along a first preset direction is a1. A length of the first portion at the first preset position along a second preset direction is b1. A spacing between a second preset position of the first portion and the optical axis of the lens assembly along the first preset direction is a2. A length of the first portion at the second preset position along the second preset direction is b2. The second preset position is located on a side of the first preset position near the optical axis of the lens assembly. a1 is greater than a2. b1 is less than b2. The first preset direction, the second preset direction, and the optical axis of the lens assembly are arranged perpendicular to each other.

In some embodiments of the present application, the first portion includes a plurality of separate bodies arranged along the second preset direction. At the first preset position of the first portion, a sum of lengths of all the separate bodies along the second preset direction is b1. At the second preset position of the first portion, a sum of lengths of all the separate bodies along the second preset direction is b2. The first portion is arranged as a plurality of separate bodies arranged in the second preset direction. A gap between the adjacent separate bodies is filled by the second portion having a low reflectivity, which can prevent poor uniformity of the detecting echo light beam received by the photosensitive member caused by concentration of a region with high reflectivity on the reflecting surface, and can effectively improve the uniformity of the detecting light signals received by the photosensitive member, thereby improving detecting effect of the optical sensing device.

In some embodiments of the present application, the number of separate bodies is n. In the first preset position of the first portion, a length of each of the separate bodies along the second preset direction is b1/n, and in the second preset position of the first portion, a length of each of the separate bodies along the second preset direction is b2/n. At various positions of the first portion, lengths of all the separate bodies in the second preset direction are the same, so that the detecting echo light beam received by the photosensitive member is more uniform, which can improve the detecting effect of the optical sensing device.

In some embodiments of the present application, in the first preset position of the first portion, the spacing of the two adjacent separate bodies along the second preset direction is c1. In the second preset position of the first portion, the spacing of the two adjacent separate bodies along the second preset direction is c2. At the various positions of the first portion, the spacing of any two adjacent separate bodies in the second preset direction is the same, so that the detecting echo light beam received by the photosensitive member is more uniform, which can improve the detecting effect of the optical sensing device.

In some embodiments of the present application, the reflecting surface has an intersection point with an optical axis of the lens assembly. The intersection point is located in the first portion. The detecting echo light beam, which can be reflected back from the target object at a very long distance from the lens assembly, can still fall on the first portion, which is beneficial for improving the long-range detecting effect of the optical sensing device.

In some embodiments of the present application, the first portion is a continuous extending structure extending toward the intersection point. Distribution of the first portion can be guaranteed to have a gradient trend of continuity, so that the reflecting surface has the feature of gradient reflectivity of continuity.

In some embodiments of the present application, the reflecting surface is an inner concave curved surface. Compared with the concave-surface reflecting structure consisting of a plurality of planes, the concave-surface reflecting structure consisting of the plurality of planes generally has a plurality of focal points, and a concave-surface reflecting structure consisting of smooth curved surfaces can take a photosensitive surface of the photosensitive member as one focal point of the concave-surface reflecting structure, so that the detecting echo light beam reflected from a plurality of positions is reflected onto the photosensitive surface after being reflected by the reflecting surface, which can improve the intensity of the detecting light signals at various positions within a preset distance received by the optical sensing device and enhance the detecting effect of the optical sensing device.

In some embodiments of the present application, the reflecting surface has a first focal point and a second focal point. Light passing through the first focal point and transmitted to the reflecting surface is reflected by the reflecting surface and then focused in the second focal point. The first focal point coincides with an exit pupil center of the lens assembly, and the second focal point is located on the photosensitive surface of the photosensitive member. The first focal point of the reflecting surface is coincidently arranged with the exit pupil center of the lens assembly. The second focal point can be located on the photosensitive surface of the photosensitive member, so that the detecting echo light beam reflected from the target object, after passing through the lens assembly and being reflected by the reflecting surface, is focused onto the photosensitive surface, which can further improve the intensity of the detecting light signals received by the optical sensing device.

In some embodiments of the present application, the second focal point of the reflecting surface is located in a center of the photosensitive surface. The second focal point of the reflecting surface is coincidently arranged with the center of the photosensitive surface. More light can be transmitted to the photosensitive surface without changing an area of the photosensitive surface, which can improve the intensity of the detected light signals received by the optical sensing device.

In a fourth aspect, the present application also provides an optical sensing device, including an optical emitting device and the optical receiving device according to any one of the above embodiments. The optical emitting device is configured to emit a detecting light beam to a target object, and the optical receiving device is configured to receive a detecting echo light beam reflected back from the target object.

In a fifth aspect, the present application provides a laser receiving device, including:

a receiving sensor;

an optical assembly arranged on a side where the photosensitive surface of the receiving sensor is located, the optical assembly including a first prism, the first prism having a first end surface, a second end surface, and a plurality of sides connected between the first end surface and the second end surface, the plurality of sides including a first side and a second side. At least a portion of laser signals reflected by a detecting target can be refracted by the first side and enter the first prism. At least a portion of laser signals refracted by the first side can be refracted by the second side and emitted from the first prism to reach the receiving sensor.

In some embodiments of the present application, a laser receiving lens is arranged on a side where the first side of the first prism is located, so that at least a portion of the laser signals reflected back by the detecting target reach the first side of the first prism via the laser receiving lens. All edge lines of the first prism are perpendicular to a receiving optical axis of the laser receiving lens and are located on the same side of the receiving optical axis.

In some embodiments of the present application, the first prism is a triangular prism. The first end surface and the second end surface are both triangular.

In some embodiments of the present application, the first end surface and the second end surface are both rectangular triangles. The first side corresponds to an oblique edge of the rectangular triangle.

In some embodiments of the present application, the optical assembly further includes a second prism. Different from a refractive index of the first prism, the second prism has a third end surface, a fourth end surface, and a plurality of sides connected between the third end surface and the fourth end surface. The plurality of sides includes a fourth side and a fifth side. The fourth side is attached to the first side of the first prism. At least a portion of the laser signals reflected by the detecting target enters the second prism via the fifth side, and then reaches the fourth side, the first side of the first prism, and the second side of the first prism.

In some embodiments of the present application, at least a portion of the laser signals reflected back by the detecting target enters the second prism directly via the fifth side.

In some embodiments of the present application, the laser receiving device includes the plurality of receiving sensors and the plurality of optical assemblies. The receiving sensors have a number equal to that of the optical assemblies. The receiving sensors and the optical assemblies are correspondingly arranged one by one.

In some embodiments of the present application, the plurality of receiving sensors are divided into at least one receiving sensor unit. Each of the receiving sensor units includes the plurality of receiving sensors distributed at intervals along a first direction. The first direction is parallel to an edge line direction of the first prism. The optical assemblies corresponding to at least two of the adjacent receiving sensors within the same receiving sensor unit are connected together.

In some embodiments of the present application, the plurality of receiving sensors are divided into at least one receiving sensor unit. Each of the receiving sensor units includes the plurality of receiving sensors distributed at intervals along a second direction. The second direction is perpendicular to an edge line direction of the first prism. The optical assemblies corresponding to at least two of the adjacent receiving sensors within the same receiving sensor unit are connected together.

In some embodiments of the present application, within the same receiving sensor unit, the first prism in the optical assembly corresponding to at least one of the receiving sensors shares the same prism with the second prism in the optical assemblies corresponding to the adjacent receiving sensors.

In a sixth aspect, the application provides a LiDAR, including:

a laser emitting device; and any of the above laser receiving devices, a first prism of the laser receiving device being located on a side of a receiving sensor far away from the laser emitting device.

The present application has the following beneficial effects: after passing through the lens assembly, the detecting echo light beam reflected back from the target object is reflected by the reflecting surface of the reflecting member. The reflecting member can change the transmission direction of the light, so that the light is transmitted to the photosensitive surface of the photosensitive member intensively. Therefore, even if the detecting echo light beam reflected back from the target object located in the preset distance range is shifted when passing through the lens assembly, the reflecting action of the reflecting member can still make most of the detecting echo light beam detected and received by the photosensitive member, so that the intensity of the detecting light signals received by the optical sensing device can be improved. At the same time, in the third and fourth aspects, the first portion is distributed according to the gradient trend by controlling an area size and an extension direction of the first portion in the reflecting surface, so that the reflecting surface has a feature of gradient reflectivity, and the intensity of the detecting light signals received by the optical sensing device can be effectively adjusted, which is beneficial to enhance close-range detecting effect and long-range detecting effect of the optical sensing device. Further, in the fifth and sixth aspects, the echo intensity of a close-range detecting target is further enhanced by correcting the offset generated by the echo signals of the close-range detecting target with aid of the first prism. Moreover, the prism does not obstruct an optical path compared to a plane diffuse mirror, occupies less optical space resources, and can facilitate the tight arrangement of the laser receiving devices and guarantee sufficient intensity of the echo signals of the close-range detecting target. The present application has excellent performance in a multiwire-beam and small-volume LiDAR, and has a broad market prospect. In addition, the optical sensing device adopts the optical receiving device described in the above embodiment. The optical sensing device is also provided with features and advantages of the optical receiving device, which is not described again here.

BRIEF DESCRIPTION OF DRAWINGS

To explain embodiments of this application more clearly, the following briefly introduces the drawings used in the embodiments. The drawings in the following description are only some embodiments of this application.

FIG. 14 is an optical path diagram of echo signals of a close-range detecting target and echo signals of a long-range detecting target in a laser receiving device shown in FIG. 12;

DETAILED DESCRIPTION

In order to make the objectives, technical solutions, and advantages of the present application clearer, the following further describes the present application in detail with reference to the drawings and embodiments. It should be understood that the embodiments described herein are only used to explain the present application, but not to limit the present application.

When a target object is measured using an optical sensing device, a detecting echo light beam reflected back from the target object needs to be processed by a lens assembly in an optical receiving device and transmitted to a photosensitive member. Compared with a relatively long distance, the detecting echo light beam reflected back from the target object close to the optical sensing device is shifted when passing through the lens assembly, which can result in a large amount of the detecting echo light beams not being detected and received by an optical sensor, resulting in a weaker intensity of detecting light signals received by the optical sensing device.

The present application provides an optical receiving device and an optical sensing device, which can improve the intensity of the detecting light signals received by the optical sensing device and improve the detecting effect of the optical sensing device.

Figure 1:
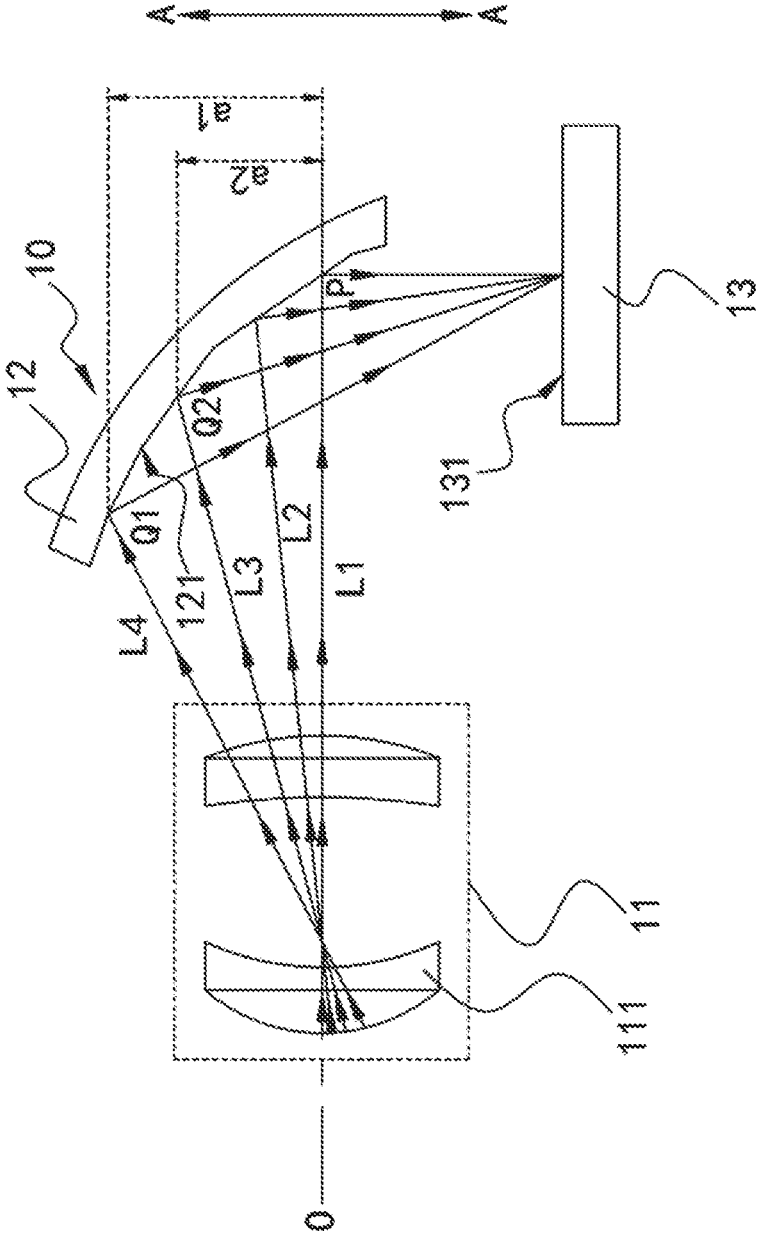
FIG. 1 is a schematic structural diagram of an optical path of an optical receiving device according to an embodiment of the present application.
Figure 3:
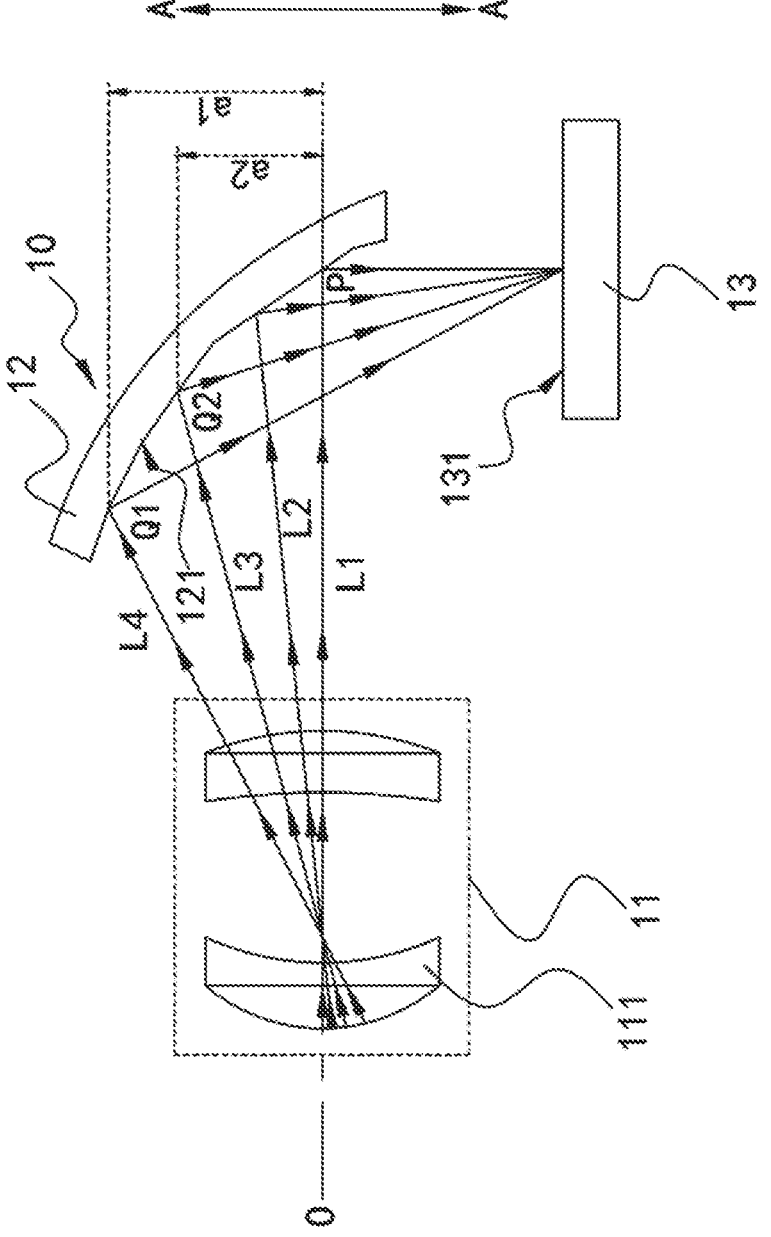
FIG. 3 is a schematic structural diagram of an optical path of an optical receiving device according to an embodiment of the present application.

As shown in FIGS. 1 and 3, the present application provides an optical receiving device 10, which can receive a detecting echo light beam reflected back from a target object and output corresponding electric signals. The optical receiving device 10 includes a lens assembly 11, a reflecting member 12, and a photosensitive member 13.

The lens assembly 11 includes at least one lens 111. The lens 111 is made of an optically transparent material such as glass or resin. The lens 111 has one or more curved surfaces, which can change the transmission direction of light, control the distribution of the light to focus the light, and ultimately image. The lens 111 can be divided into a convex lens and a concave lens according to the shape and function of the lens. In the present application, no restriction is provided on the material, type, size, or the like of the lens 111. At least one of the lenses 111 in the lens assembly 11 is provided. In order for the lens assembly 11 to have a variety of different optical properties, the plurality of lenses 111 are generally provided. The plurality of lenses 111 can be arranged together in a layered manner to form a lens of the optical receiving device 10. Optical axes O of the plurality of lenses 111 can be coincident. The optical axis O is a line passing through the center of the lens 111. The plurality of lenses 111 can be the same or different, which is not limited in this embodiment.

The reflecting member 12 is located on a transmission path of light passing through the lens assembly 11. The reflecting member 12 has a reflecting surface 121. The reflecting surface 121 is configured to reflect the light passing through the lens assembly 11. As will be appreciated, the detecting echo light beam reflected back from the target object at a distance from the optical sensing device within a preset distance is reflected by the reflecting surface 121 of the reflecting member 12 after passing through the lens assembly 11. The transmission path of the light can be changed with the reflecting member 12 so that the light passing through the lens assembly 11 is transmitted to the photosensitive member 13. The reflecting surface 121 is a smooth mirror surface having a mirror reflection function. The reflecting surface 121 can be formed on the reflecting member 12 by grinding or other means. The reflecting surface 121 can also be formed by coating or affixing a reflecting layer on the reflecting member 12. A material of the reflecting member 12 can be selected according to the actual situation, which is not specifically limited in the present application. A size of the reflecting surface 121 can be selected according to actual needs, which is not specifically limited in the present application.

The photosensitive member 13 has a photosensitive surface 131. The photosensitive surface 131 is configured to receive light reflected by the reflecting surface 121. The photosensitive member 13 can receive light reflected by the reflecting member 12, convert light signals into electric signals, and then transmit the electric signals to a control portion in the optical sensing device. After the control portion in the optical sensing device processes the electric signals, distance, azimuth, altitude, speed, attitude, shape, and other parameters of the target object can be obtained. The photosensitive member 13 can be an optical sensor. The specific working principle of the optical sensor has been publicized in the related art, and is not described in detail in the present application. The model and type of the optical sensor can be selected according to actual needs. The shape of the photosensitive surface 131 can be a shape such as a circle, an ellipse, a square, or a triangle, which is not specifically limited in the present application.

It should be described that after passing through the lens assembly 11, the detecting echo light beam reflected back from the target object is reflected by the reflecting surface 121 of the reflecting member 12. The reflecting member 12 can change the transmission direction of the light, so that the light is transmitted to the photosensitive surface 131 of the photosensitive member 13 intensively. Therefore, even if the detecting echo light beam reflected back from the target object located in a preset distance range is shifted when passing through the lens assembly 11, the reflecting of the reflecting member 12 can still make most of the detecting echo light beam detected and received by the photosensitive member 13, so that intensity of the detecting light signals received by the optical sensing device can be improved.

In some embodiments, as shown in FIG. 1, the reflecting surface 121 is an inner concave surface. As will be appreciated, an inner concave-surface reflecting structure has a light-focusing effect. After divergent light is emitted to the inner concave reflecting surface 121, the detecting echo light beam can be reflected by the reflecting surface 121 so that the detecting echo light beam is focused after being reflected by surface 121. Therefore, the light reflected by the reflecting surface 121 is focused on the photosensitive surface 131 of the photosensitive member 13, so that a majority of the detecting echo light beams reflected back by the target object located within the preset distance are detected and received by the photosensitive member 13.

The reflecting surface 121 can consist of a plurality of reflecting planes. The plurality of reflecting planes can be sequentially connected to form an inner concave-surface reflecting structure. It can be understood that reflecting positions of the detecting echo light beams reflected back from the target object at different distances from the lens assembly 11 on the reflecting surface 121 are different. Therefore, when the reflecting surface 121 consists of the plurality of reflecting planes, each of the reflecting planes can adjust an optical path on the detecting echo light beam reflected back from the target object within a certain distance range, so that the detecting echo light beam reflected back from the target object within a corresponding distance from the reflecting plane is incident on the photosensitive surface 131.

Figure 4:
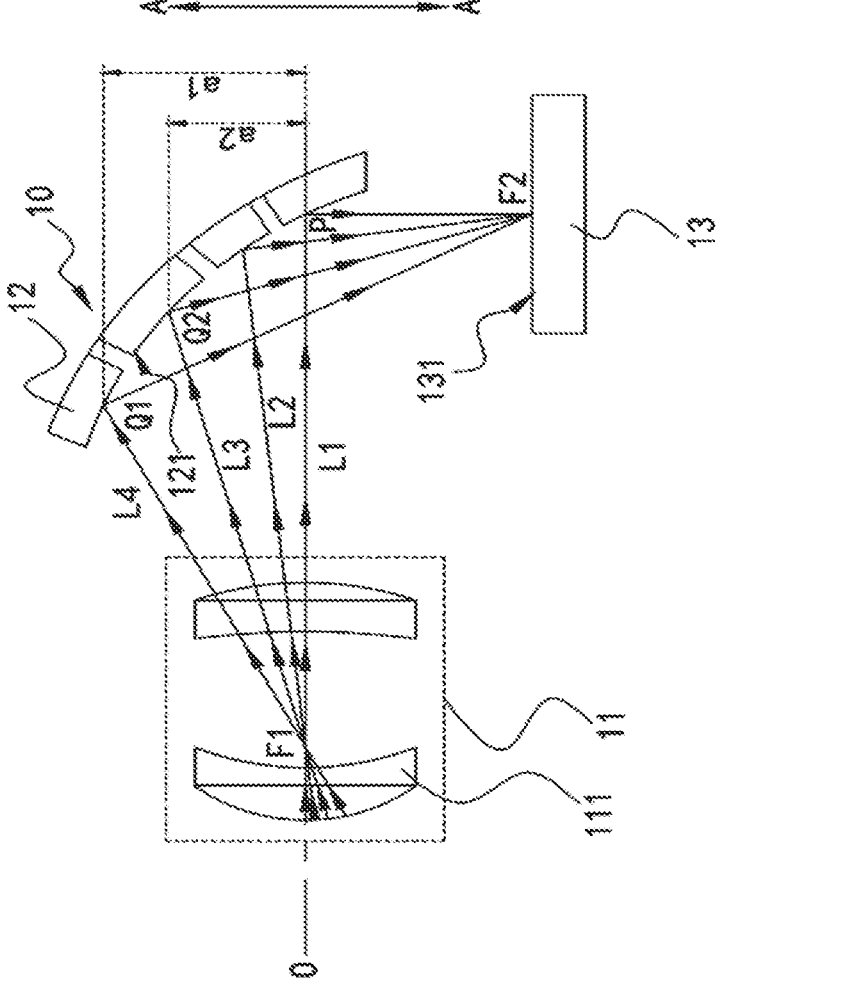
FIG. 4 is a schematic structural diagram of an optical path of an optical receiving device according to an embodiment of the present application.

As shown in FIGS. 3 and 4, the reflecting surface 121 can also be a concave curved surface. The reflecting surface 121 can be a circular arc surface or an elliptical arc surface. Compared with the concave-surface reflecting structure consisting of the plurality of reflecting planes, the concave-surface reflecting structure consisting of the plurality of reflecting planes generally has a plurality of focal points, and a concave-surface reflecting structure consisting of smooth curved surfaces can take the photosensitive surface 131 of the photosensitive member 13 as one focal point of the concave-surface reflecting structure, so that the detecting echo light beams reflected from a plurality of positions are reflected onto the photosensitive surface 131 after being reflected by the reflecting surface 121, which can improve the intensity of the detecting light signals at various positions within the preset distance received by the optical sensing device and enhance the detecting effect of the optical sensing device.

As shown in FIG. 3, the reflecting surface 121 can consist of one inner concave curved surface. In some embodiments, as shown in FIG. 4, the reflecting surface 121 can also consist of the plurality of inner concave curved surfaces. When the reflecting surface 121 consists of the plurality of inner concave curved surfaces, the plurality of inner concave curved surfaces can be connected to each other or arranged at intervals. Each of the inner concave curved surfaces can correspondingly adjust the optical path of the detecting echo light beam reflected back from the target object within a certain distance range, so that the detecting echo light beam reflected back from the target object within a corresponding distance range of the reflecting plane is incident on the photosensitive surface 131.

It should also be noted that the detecting echo light beam reflected back from the target object closer to the lens assembly 11 is shifted more when passing through the lens assembly 11, but the detecting echo light beam reflected back from the target object far away from the lens assembly 11 is shifted very little when passing through the lens assembly 11. Therefore, by focusing the detecting echo light beam reflected back from the target object which is within the preset distance, the intensity of the detecting light signals received by the optical sensing device can be improved.

Therefore, the length of the reflecting surface 121 is related to the preset distance range that the optical sensing device needs to detect. The detecting echo light beam reflected back from the target object located within the preset distance range needs to be focused via the reflecting member 12. In general, the larger the preset distance range that the optical sensing device needs to detect, the larger the length of the reflecting surface 121. For example, the optical sensing device only needs to detect the target object outside of 20. In this case, the preset distance range is 20 m to 50 m, and the reflecting surface 121 has a length of 8 cm. When the preset distance range is 20 m to 80 m, the length of the reflecting surface 121 is 10 cm. The preset distance range that the optical sensing device needs to detect can be selected according to actual needs, which is not limited in the present application Referring to FIG. 4, the reflecting surface 121 has a first focal point F1 and a second focal point F2. Light passing through the first focal point F1 and transmitted to the reflecting surface 121 is reflected by the reflecting surface 121 and then focused on the second focal point F2. The first focal point F1 coincides with an exit pupil center of the lens assembly 11. The second focal point F2 can be located in the photosensitive surface 131 of the photosensitive member 13.

It should be noted that for the person skilled in the art, the concave-surface reflecting structure consisting of a curved surface necessarily has two focal points. Without considering the effect of other components on light, after being reflected by the concave-surface reflecting structure, light emitted from one focal point of the concave-surface reflecting structure is inevitably focused on the other focal point of the concave-surface reflecting structure. The focal point of the light after being reflected by the concave-surface reflecting structure is the focal point of the concave-surface reflecting structure. For an optical system such as the lens assembly 11, an image formed by an aperture diaphragm of the optical system in a space of the optical system is referred to as "an exit pupil" of the optical system. The exit pupil center refers to the center of the exit pupil. Light incident on the lens assembly 11 intersects with the exit pupil center in the lens assembly 11. The exit pupil center is an optical center of the lens assembly 11. When light passing through the exit pupil center passes through the lens assembly 11, the transmission direction of the light is not changed.

In some embodiments, the first focal point F1 of the reflecting surface 121 is coincidently arranged with the exit pupil center of the lens assembly 11. The second focal point F2 can be located on the photosensitive surface 131 of the photosensitive member 13, so that the detecting echo light beam reflected from the target object, after passing through the lens assembly 11 and being reflected by the reflecting surface 121, is focused onto the photosensitive surface 131, which can further improve the intensity of the detecting light signals received by the optical sensing device.

With continued reference to FIG. 4, the second focal point F2 of the reflecting surface 121 can be located at the center of the photosensitive surface 131.

As will be appreciated, in a process of transmitting the light reflected by the reflecting surface 121 to the second focal point F2 of the reflecting surface 121, because of the influence of air and other factors, partial light is deflected, resulting in partial light being scattered to the vicinity of the second focal point F2, while the second focal point F2 of the reflecting surface 121 is coincidently arranged with the center of the photosensitive surface 131, which can cause more light to be transmitted onto the photosensitive surface 131 without changing an area of the photosensitive surface 131.

Figure 2:
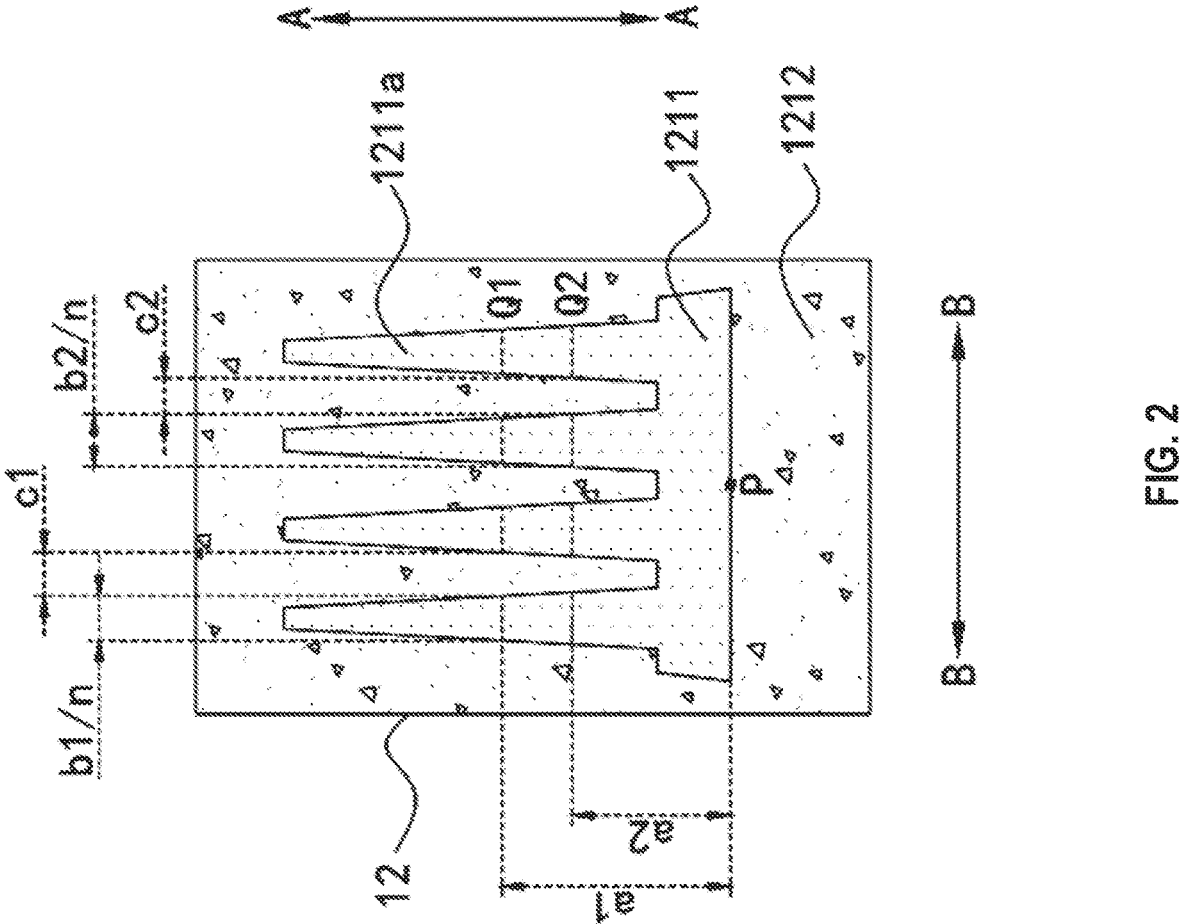
FIG. 2 is a schematic structural diagram of a reflecting surface according to an embodiment of the present application.

Referring still to FIGS. 1 and 2, the reflecting surface 121 includes a first portion 1211 and a second portion 1212 arranged along an outer boundary of the first portion 1211. The first portion 1211 has a reflectivity greater than that of the second portion 1212. The first portion 1211 is a region with a high reflectivity on the reflecting surface 121. The second portion 1212 is a region with a low reflectivity on the reflecting surface 121. The first portion 1211 can be a white reflecting surface 121. The second portion 1212 can be a black reflecting surface 121. Materials for manufacturing the first portion 1211 and the second portion 1212 can be selected according to actual needs. To ensure the reflecting surface 121 has a good reflection performance, the first portion 1211 has a reflectivity greater than that of the second portion 1212.

In some embodiments, a spacing between a first preset position Q1 of the first portion 1211 and the optical axis O of the lens assembly 11 along a first preset direction AA is a1. A length of the first portion 1211 at the first preset position Q1 along a second preset direction BB is b1. A spacing between a second preset position Q2 of the first portion 1211 and the optical axis O of the lens assembly 11 along the first preset direction AA is a2. A length of the first portion 1211 at the second preset position Q2 along the second preset direction BB is b2. The second preset position Q2 is located on a side of the first preset position Q1 near the optical axis O of the lens assembly 11.

a1 is greater than a2, and b1 is less than b2. The first preset direction AA, the second preset direction BB, and the optical axis O of the lens assembly 11 are arranged perpendicular to each other. It should be noted that the first preset position Q1 and the second preset position Q2 can be anywhere on the first portion 1211.

As can be understood, in a process of transmitting the detecting echo light beam reflected from the target object to the lens assembly 11, due to the influence of air and other factors, the detecting echo light beam loses a certain amount of energy in a transmission process. Therefore, the intensity of the detecting echo light beam reflected from the target object at a relatively long distance from the lens assembly 11 is relatively low. The intensity of the detecting light signal received by the optical sensing device is also relatively low. The intensity of the detecting echo light beam reflected from the target object at a relatively short distance from the lens assembly 11 is relatively high. The intensity of the detecting light signal received by the optical sensing device is also relatively high. The intensity of the detecting light signal received by the optical sensing device that is too high or too low affects the detecting effect of the optical sensing device.

It will also be appreciated that the further away the target object is from the lens assembly 11, the smaller the angle between the detecting echo light beam reflected back from the target object and the optical axis O, that is, the smaller the distance between a reflection point of the detecting echo light beam reflected back from the target object on the reflecting surface 121 and the optical axis O along the first preset direction AA (L1-L4 in FIG. 1 is the detecting echo light beam reflected back from the target object from far to near).

In some embodiments, a position on the first portion 1211 that is less spaced from the optical axis O in the first preset direction AA is greater along a length of the second preset direction BB, so that the first portion 1211 has a property of reflectance performance gradation. The first portion 1211 has a reflectivity greater than that of the second portion 1212, so that an area size and an extension direction of the first portion 1211 in the reflecting surface 121 can be controlled. The first portion 1211 is distributed according to a gradient trend, so that the reflecting surface 121 has a feature of gradient reflectivity. The intensity of the detecting light signals received by the optical sensing device can be effectively adjusted. For example, the detecting echo beam reflected back from the target object at a relatively long distance from the lens assembly 11 is more strongly reflected on the reflective surface 121, and the loss of the detecting light signal received by the optical sensing device is small, which are advantageous to improve the long-range detecting effect of the optical sensing device. Additionally, the reflection of the detecting echo light beam reflected back from the target object close to the lens assembly 11 is weak, and the loss of the detecting light signals received by the optical sensing device is large, which can effectively reduce the intensity of the detecting light signal received by the optical sensing device, and be advantageous to improve the close-range detecting effect of the optical sensing device.

It should also be noted that only two different positions on the first portion 1211 with different reflectance properties are provided, such as the first preset position Q1 and the second preset position Q2, such that the reflecting surface 121 has different reflectivity only at the first preset position Q1 and the second preset position Q2. The first portion 1211 can also have gradient reflectance only in a partial region, such that the reflecting surface 121 has gradient reflectance in a partial region. In some embodiments, the first portion 1211 as a whole can also have gradient reflectance, such that the reflecting surface 121 has gradient reflectance at a region corresponding to the first portion 1211.

Figure 8:
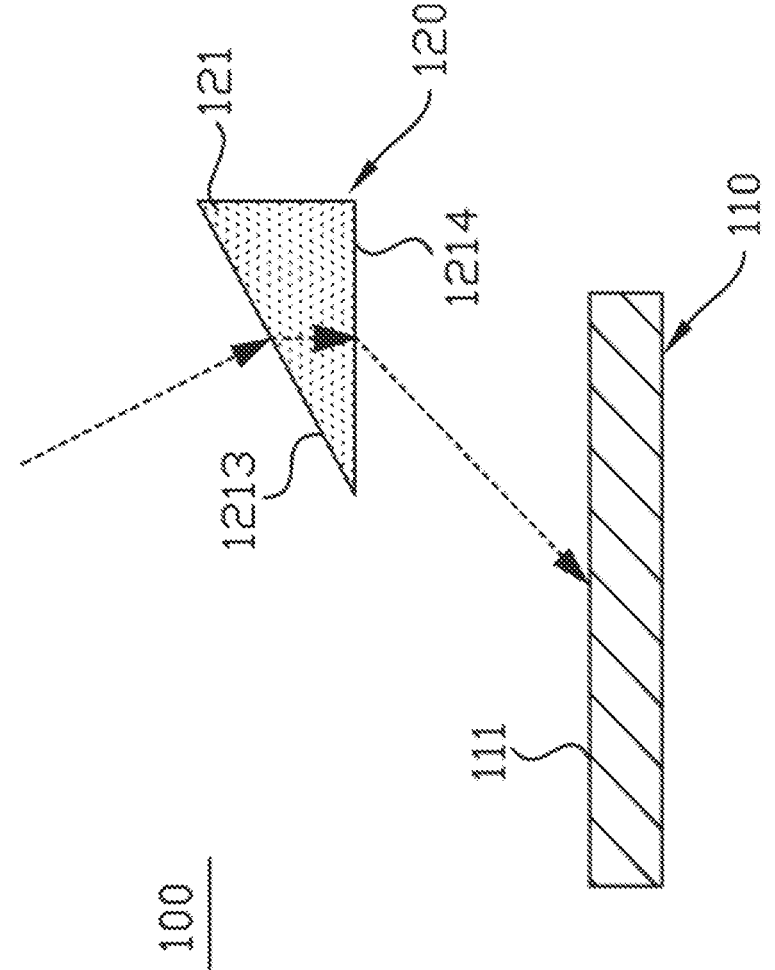
FIG. 8 is a cross-sectional diagram of a first laser receiving device provided in an embodiment of the present application.
Figure 9:
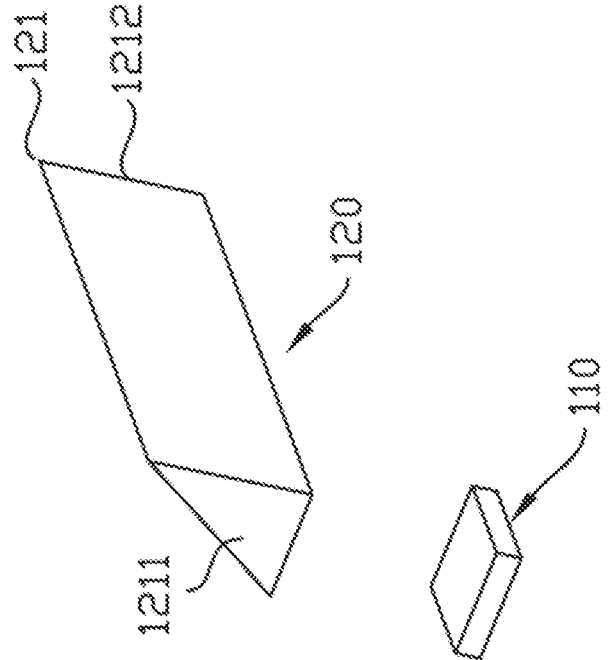
FIG. 9 is a perspective diagram of a laser receiving device shown in FIG. 8.

Referring to FIGS. 8 and 9, in some embodiments of the present application, the first portion 1211 includes a plurality of separate bodies 1211a arranged along the second preset direction BB. At the first preset position Q1 of the first portion 1211, a sum of lengths of all the separate bodies 1211a along the second preset direction BB is b1. At the second preset position Q2 of the first portion 1211, a sum of lengths of all the separate bodies 1211a along the second preset direction BB is b2. Specific numerical values of b1 and b2 can be selected according to actual needs, which is not specifically limited in the present application.

In some embodiments, the first portion 1211 includes the plurality of separate bodies 1211a. A length of the first portion 1211 along the second preset direction BB at the first preset position Q1 refers to a sum of lengths of all the separate bodies 1211a along the second preset direction BB at the first preset position Q1. A length of the first portion 1211 along the second preset direction BB at the second preset position Q2 refers to a sum of lengths of all the separate bodies 1211a along the second preset direction BB at the second preset position Q2. The first portion 1211 is arranged as the plurality of separate bodies 1211a arranged along the second preset direction BB. A gap between the adjacent separate bodies 1211a is filled by the second portion 1212 with a low reflectivity, which can prevent a region with a high reflectivity on the reflecting surface 121 from being concentrated. This results in the detecting echo light beam received by the photosensitive member 13 being poorly uniform, and can effectively enhance the uniformity of the detecting light signal received by the optical sensing device.

It should be noted that FIG. 9 only illustrates a case where the plurality of separate bodies 1211a are finally connected to form an integrated structure. According to actual needs, the plurality of separate bodies 1211a can also be arranged at intervals from each other. In some embodiments, according to actual needs, only one separate body 1211a can be arranged. It can also be understood that FIG. 1 only illustrates a case where the overall shape of the separate body 1211a is trapezoidal. According to actual needs, the overall shape of the separate body 1211a can also be triangular, arcuate, or other shapes, which are not defined in the present application.

Referring to FIGS. 8 and 9, in an embodiment of the present application, the number of the separate bodies 1211a is n. At the first preset position Q1 of the first portion 1211, each of the separate bodies 1211a along the length of the second preset direction BB is b1/n. At the second preset position Q2 of the first portion 1211, all the separate bodies 1211a have the same length along the second preset direction BB, and the length of each of the separate bodies 1211a along the second preset direction BB is b1/n. At the second preset position Q2 of the first portion 1211, all the separate bodies 1211a along the second preset direction BB have the same length, and the length of each of the separate bodies 1211a along the second preset direction BB is b2/n, so that the detecting echo light beam received by the photosensitive me ember 13 is more uniform. A specific numerical value of n can be selected according to actual needs, which is not specifically limited in the present application.

At the first preset position Q1 of the first portion 1211, a spacing between the adjacent two separate bodies 1211a along the second preset direction BB can be c1. At the second preset position Q2 of the first portion 1211, the spacing between the adjacent two separate bodies 1211a along the second preset direction BB can be c2, that is, at the first preset position Q1 of the first portion 1211, the spacing between any adjacent two separate bodies 1211a along the second preset direction BB can be the same. At the second preset position Q2 of the first portion 1211, the spacing between any adjacent two separate bodies 1211a along the second preset direction BB can also be the same, so that the detecting echo light beam received by the photosensitive member 13 is more uniform. Specific numerical values of c1 and c2 can be selected according to actual needs, which is not specifically limited in the present application.

It should be noted that, in some embodiments, the plurality of photosensitive members 13 can be arranged in the second preset direction BB. The separate bodies 1211a correspond to the photosensitive members 13 one by one. That is, the detecting echo light beam reflected by one separate body 1211a is received by the corresponding photosensitive member 13. The spacing of the two adjacent separate bodies 1211a in the second preset direction BB is related to the spacing of the two adjacent photosensitive members 13 in the second preset direction BB. When the photosensitive members 13 are arranged evenly, at the first preset position Q1 of the first portion 1211, the spacing of any two adjacent separate bodies 1211a in the second preset direction BB is equal. When the photosensitive members 13 are not uniformly arranged, at the first preset position Q1 of the first portion 1211, the spacing of the adjacent two separate bodies 1211a along the second preset direction BB is not equal.

In an embodiment of the present application, the reflecting surface 121 has an intersection point P with the optical axis O of the lens assembly 11. The intersection point P is located in the first portion 1211.

It can be understood that the detecting echo light beam reflected back from the target object at a relatively long distance from the lens assembly 11 has a greater energy loss during transmission of the detecting echo light beam to the lens assembly 11, and a distance between a reflection point on the reflection surface 121 and the intersection point P is closer. In some embodiments, the intersection point P is arranged in the first portion 1211, which can ensure that the detecting echo light beam reflected back from the target object at a relatively long distance from the lens assembly 11 can still fall on the first portion 1211. This is beneficial to improve the long-range detecting effect of the optical sensing device.

Further, the intersection point P can be located at a center of a boundary of the first portion 1211.

With continued reference to FIGS. 1 and 2, the first portion 1211 can be a continuous extending structure extending toward the intersection point P. It should be noted that the continuous extending structure refers to the first portion 1211 being a continuous uninterrupted structure in a direction extending toward the intersection point P, thereby ensuring that the distribution of the first portion 1211 has a gradient trend of continuity. Therefore, the reflecting surface 121 has a feature of the gradient reflectivity of continuity.

Referring to FIGS. 1 and 2, in some embodiments, the reflecting surface 121 can be the inner concave surface. The inner concave-surface reflecting structure has a light-focusing effect. After the divergent light is emitted to the inner concave reflecting surface 121, the detecting echo light beam can be reflected by the reflecting surface 121 so that the detecting echo light beam is focused after the reflecting surface 121 is reflected. Therefore, the light reflected by the reflecting surface 121 is focused on the photosensitive surface 131 of the photosensitive member 13, so that a majority of the detecting echo light beams reflected back by the target object located within the preset distance are detected and received by the photosensitive member 13.

The reflecting surface 121 consists of the plurality of reflecting planes. The plurality of reflecting planes can be sequentially connected to form the inner concave-surface reflecting structure. It can be understood that the reflecting positions of the detecting echo light beams reflected back from the target object at different distances from the lens assembly 11 on the reflecting surface 121 are different. Therefore, when the reflecting surface 121 consists of the plurality of reflecting planes, each of the reflecting planes can adjust the optical path on the detecting echo light beam reflected back from the target object within a certain distance range, so that the detecting echo light beam reflected back from the target object within a corresponding distance from the reflecting plane is incident on the photosensitive surface 131.

In some embodiments, as shown in FIGS. 3 and 4, the reflecting surface 121 can also be the inner concave curved surface. The reflecting surface 121 can be the circular arc surface or the elliptical arc surface. Compared with the concave-surface reflecting structure consisting of the plurality of reflecting planes, the concave-surface reflecting structure consisting of the plurality of reflecting planes generally has the plurality of focal points, and a concave-surface reflecting structure consisting of the smooth curved surfaces can take the photosensitive surface 131 of the photosensitive member 13 as one focal point of the concave-surface reflecting structure, so that the detecting echo light beams reflected from the plurality of positions are reflected onto the photosensitive surface 131 after being reflected by the reflecting surface 121, which can improve the intensity of the detecting light signals at the various positions within the preset distance received by the optical sensing device and enhance the detecting effect of the optical sensing device.

As shown in FIG. 3, the reflecting surface 121 can consist of one inner concave curved surface. In some embodiments, as shown in FIG. 4, the reflecting surface 121 can consist of the plurality of inner concave curved surfaces. When the reflecting surface 121 consists of the plurality of inner concave curved surfaces, the plurality of inner concave curved surfaces can be connected to each other or arranged at intervals. Each of the inner concave curved surfaces can correspondingly adjust the optical path of the detecting echo light beam reflected back from the target object within a certain distance range, so that the detecting echo light beam reflected back from the target object within the corresponding distance range of the reflecting plane is incident on the photosensitive surface 131.

It should be noted that, as shown in FIG. 4, when the plurality of inner concave surfaces are spaced apart, the gap between the adjacent concave surfaces can also have the effect of reducing the partial reflectivity, so that the reflection of the detecting echo light beam reflected back from the target object closer to the lens assembly 11 is weaker on the reflecting surface 121, which can effectively reduce the intensity of the detecting light signals received by the optical sensing device, and is conducive to improving the close-range detecting effect of the optical sensing device.

It should also be noted that the detecting echo light beam reflected back from the target object closer to the lens assembly 11 is shifted more when passing through the lens assembly 11. In some embodiments, combining the concave-surface reflecting structure with the feature of the gradient reflectivity of the reflecting surface 121 can effectively increase the intensity of the detecting echo light beam reflected back from the target object closer to the lens assembly 11, and can effectively reduce the intensity of the detecting light signals received by the optical sensing device when the optical sensing device detects the close-range target object, which is beneficial to improve the close-range detecting effect of the optical sensing device.

It should also be noted that the detecting echo light beam reflected back from the target object far away from the lens assembly 11 is shifted very little when passing through the lens assembly 11. Therefore, only the detecting echo light beam reflected back from the target object within the preset distance can be focused to improve the intensity of the detecting light signals received by the optical sensing device.

Therefore, the length of the reflecting surface 121 is related to the preset distance range that the optical sensing device needs to detect. The detecting echo light beam reflected back from the target object located within the preset distance range needs to be focused via the reflecting member 12. In general, the larger the preset distance range that the optical sensing device needs to detect, the larger the length of the reflecting surface 121. For example, the optical sensing device only needs to detect the target object outside of 20. In this case, the preset distance range is 20 m to 50 m, and the reflecting surface 121 has a length of 8 cm. When the preset distance range is 20 m to 80 m, the length of the reflecting surface 121 is 10 cm. The preset distance range that the optical sensing device needs to detect can be selected according to actual needs, which is not limited in the present application.

Referring to FIG. 4, the reflecting surface 121 has the first focal point F1 and the second focal point F2. The light passing through the first focal point F1 and transmitted to the reflecting surface 121 is reflected by the reflecting surface 121 and then focused in the second focal point F2. The first focal point F1 coincides with the exit pupil center of the lens assembly 11. The second focal point F2 can be located in the photosensitive surface 131 of the photosensitive member 13.

It should be noted that for the person skilled in the art, the concave-surface reflecting structure consisting of the curved surface necessarily has two focal points. Without considering the effect of other components on light, after being reflected by the concave-surface reflecting structure, the light emitted from one focal point of the concave-surface reflecting structure is inevitably focused on the other focal point of the concave-surface reflecting structure. The focal point of the light after being reflected by the concave-surface reflecting structure is the focal point of the concave-surface reflecting structure. For the optical system such as the lens assembly 11, the image formed by the aperture diaphragm of the optical system in the space of the optical system is referred to as "the exit pupil" of the optical system. The exit pupil center refers to the center of the exit pupil. The light incident on the lens assembly 11 intersects with the exit pupil center in the lens assembly 11. The exit pupil center is the optical center of the lens assembly 11. When the light passing through the exit pupil center passes through the lens assembly 11, the transmission direction of the light is not changed.

In some embodiments, the first focal point F1 of the reflecting surface 121 is coincidently arranged with the exit pupil center of the lens assembly 11, and the second focal point F2 can be located on the photosensitive surface 131 of the photosensitive member 13, so that the detecting echo light beam reflected from the target object, after passing through the lens assembly 11 and being reflected by the reflecting surface 121, is focused onto the photosensitive surface 131, which can further improve the intensity of the detecting light signals received by the optical sensing device.

With continued reference to FIG. 4, the second focal point F2 of the reflecting surface 121 can be located at the center of the photosensitive surface 131. In the process of transmitting the light reflected by the reflecting surface 121 to the second focal point F2 of the reflecting surface 121, because of the influence of air and other factors, the partial light is deflected, resulting in partial light being scattered to the vicinity of the second focal point F2, while the second focal point F2 of the reflecting surface 121 is coincidently arranged with the center of the photosensitive surface 131, which can cause more light to be transmitted onto the photosensitive surface 131 without changing an area of the photosensitive surface 131.

Figure 5:
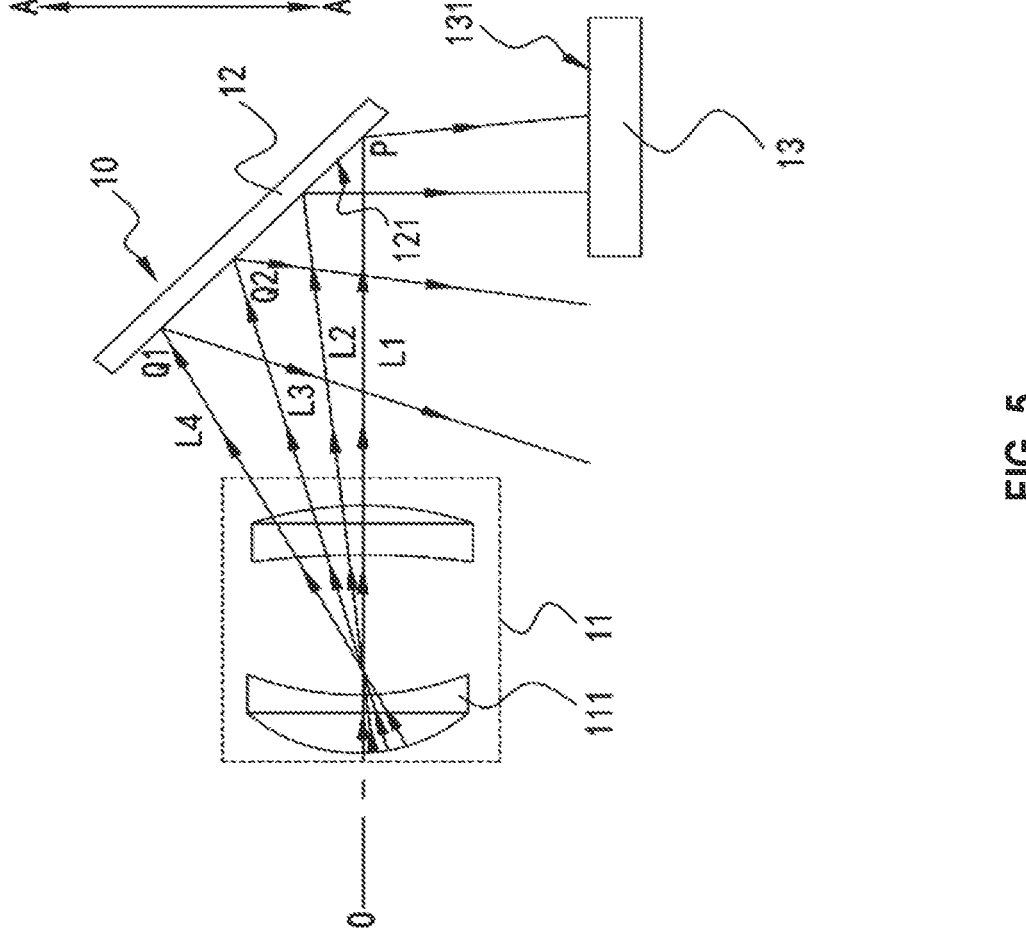
FIG. 5 is a schematic structural diagram of an optical path of an optical receiving device according to an embodiment of the present application.
Figure 6:
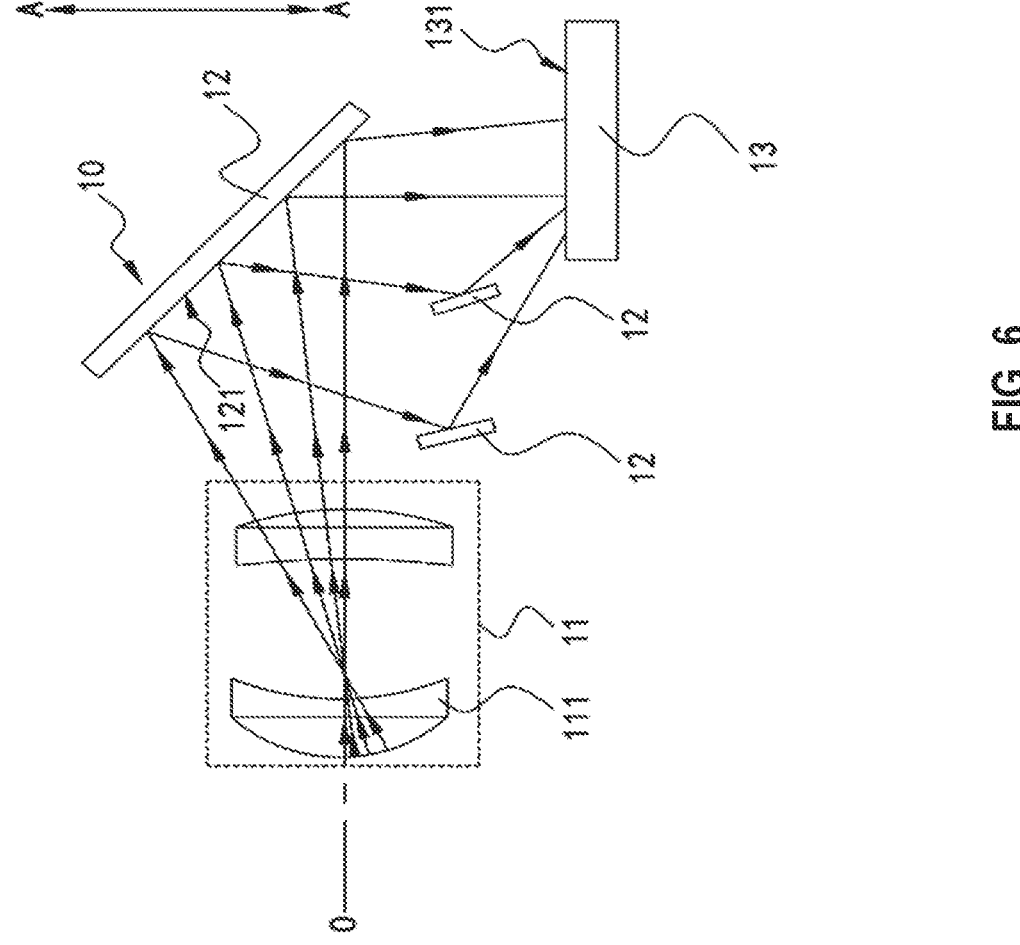
FIG. 6 is a schematic structural diagram of an optical path of an optical receiving device according to an embodiment of the present application.

As shown in FIG. 5, in some embodiments, the reflecting surface 121 is a plane. It can be understood that relative to the concave-surface reflecting structure, although the focusing effect of the plane-reflecting structure is slightly worse, the plane-reflecting structure is easier to form, and the production cost of the reflecting member can be reduced under the premise that the optical sensing device can receive detecting light signals with sufficient intensity.

It should be noted that, as shown in FIG. 4, when the reflecting surface 121 is the plane, one reflecting member 12 can be arranged. In this case, the transmission direction of the detecting echo light beam after passing through the lens assembly 11 can be changed by only one reflecting member 12, so that the detecting echo light beam is intensively transmitted to the photosensitive surface 131 of the photosensitive member 13.

In some embodiments, as shown in FIG. 5, when the reflecting surface 121 is the plane, the plurality of reflecting members 12 can also be arranged. By designing the positions of the plurality of reflecting members 12, the plurality of reflecting members 12 cooperate with each other. The transmission direction of the detecting echo light beam after passing through the lens assembly 11 can be changed a plurality of times, so that more detecting echo light beams are transmitted intensively onto the photosensitive surface 131 of the photosensitive member 13.

As shown in FIGS. 1 to 6, in some embodiments, the photosensitive surface 131 of the photosensitive member 13 is arranged in parallel to the optical axis O of the lens assembly 11. The reflecting surface 121 is obliquely arranged relative to the photosensitive surface 131, so as to facilitate placement of the lens assembly 11, the reflecting member 12, and the photosensitive member 13 in the optical sensing device.

In some embodiments, positions of the lens assembly 11, the reflecting member 12, and the photosensitive member 13 can be selected according to actual needs. For example, the lens assembly 11 and the photosensitive member 13 are located on the same side of the reflecting member 12. The reflecting surface 121 of the reflecting member 12 is arranged in parallel to the photosensitive member 131 of the photosensitive member 13. The optical axis O of the lens assembly 11 is obliquely arranged relative to the reflecting surface 121.

Figure 7:
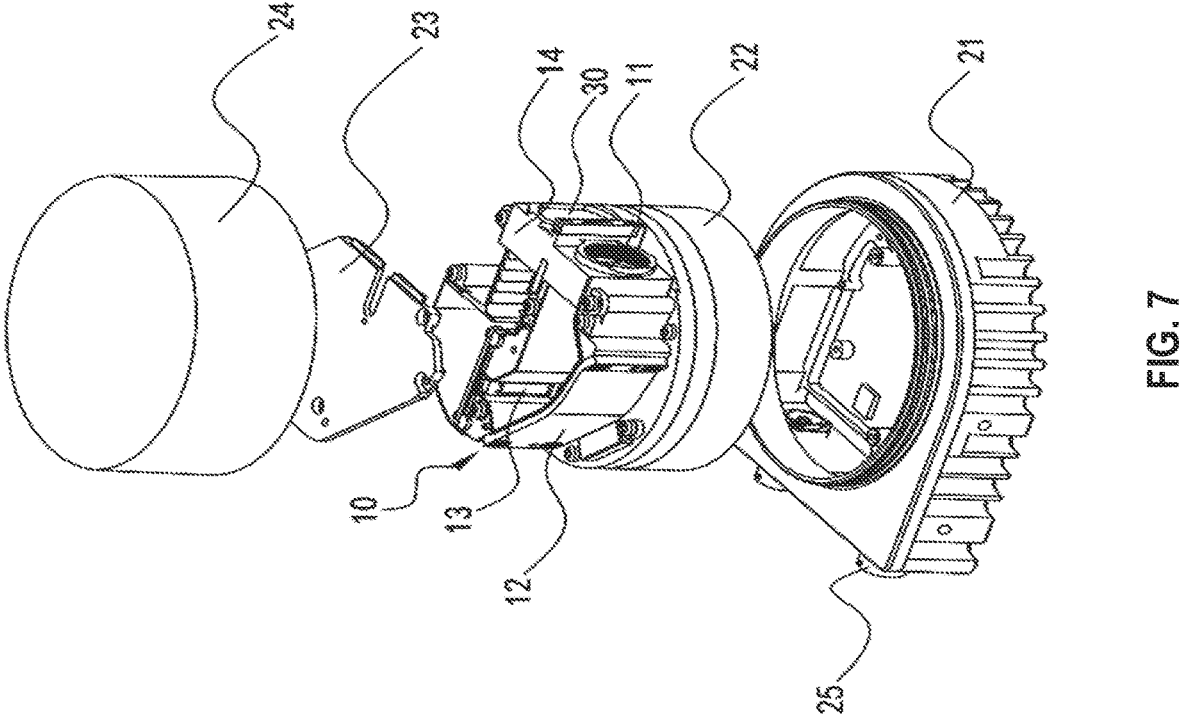
FIG. 7 is a perspective schematic structural diagram of an optical sensing device according to an embodiment of the present application.

Based on the above optical receiving device 10, the present application also provides an optical sensing device. As shown in FIG. 7, the optical sensing device includes an optical emitting device 30 and an optical receiving device 10 according to any of the above embodiments.

The optical emitting device 30 is configured to emit a detecting light beam to a target object. The optical receiving device 10 is configured to receive a detecting echo light beam reflected back from the target object.

In some embodiments, the optical emitting device 30 includes a light source. The light source can emit a detecting light beam to the target object. The light source can be a surface light source, a spot light source, or a ray light source. The light source can be a laser light source. In some embodiments, the light source can be other light sources, such as a high-intensity LED light source, which is not specifically limited in the present application.

In some embodiments, the optical sensing device can include a control portion. After the control portion processes electric signals, distance, azimuth, altitude, speed, attitude, shape, and other parameters of the target object can be obtained, thereby realizing a detecting function. The control portion can be a Microcontroller Unit (MCU).

For example, taking the optical sensing device as a LiDAR applied on a vehicle, the light source in the optical sensing device emits the detecting light beam to the target object according to emitted signals. The optical receiving device 10 in the optical sensor receives the detecting echo light beam reflected from the target object and outputs corresponding electric signals. The control portion in the optical sensor forms a radar point cloud map after processing the electric signals. After data of the radar point cloud map is processed, the distance, azimuth, altitude, speed, attitude, shape, and other parameters of the target object can be obtained, thereby realizing a radar detecting function. According to actual needs, the optical sensing device can also realize functions of diameter detection, surface roughness detection, strain detection, displacement detection, vibration detection, speed detection, distance detection, and acceleration detection of a part as well as shape detection of an object.

In some embodiments, the optical sensing device can be applied in an environment sensing system of the vehicle. The optical sensor can also be applied in an environment sensing system of an unmanned aerial vehicle, a robot, or other apparatuses to realize 3D sensing, environmental image sensing, and other functions. The optical sensing device can also be applied to an active suspension system of a vehicle. For example, in the active suspension system, the optical sensing device can send corresponding signals to an electric control unit of the vehicle according to vehicle body height, vehicle speed, steering angle, speed, braking, etc. The electric control unit of the vehicle controls an actuating mechanism of a suspension, so that the stiffness of the suspension, a damping force of a dampener, the vehicle body height, and other parameters of the suspension are changed, so that the vehicle has good ride comfort and operational stability. The optical sensing device can also be applied to the light control system, vehicle speed measuring system, and traveling control system of the vehicle.

Referring to FIG. 7, in some embodiments, the optical sensing device further includes a base 21, a rotating driving device 22, a cover plate 23, a protecting cover 24, and an outer interface 25.

The base 21 has a containing cavity. The rotating driving device 22 is located in the containing cavity. The optical receiving device 10 and the optical emitting device 30 are mounted on the rotating driving device 22. The optical emitting device 30 is arranged side by side with the optical receiving device 10. A light outlet of the optical emitting device 30 is located on the same side as a light inlet of the optical receiving device 10. Light emitted by a light source is emitted from the light outlet, reflected by the target object and then incident into the optical receiving device 10. The rotating driving device 22 can drive the optical receiving device 10 and the optical emitting device 30 to rotate to change orientations of the light source and a lens assembly 11 so that the optical receiving device 10 can better receive the detecting echo light beam reflected back from the target object. The rotating driving device 22 can be a device such as an electric motor, a motor, or the like that has power and is capable of driving the optical receiving device 10 and the optical emitting device 30 to rotate.

In some embodiments, the optical receiving device 10 has a bracket body 14. The cover plate 23 covers the bracket body 14. The cover plate 23 encloses the bracket body 14 to form a closed light transmitting channel. The detecting echo light beam reflected from the target object is transmitted in the light transmitting channel after passing through the lens assembly.

In some embodiments, a protecting cover 24 is arranged on the base 21. A protecting cavity can be enclosed between the protecting cover 24 and the base 21. The optical receiving device 10 is housed within the protecting cavity to protect the optical receiving device 10 via the protective cover 24. The protecting cover 24 is detachably connected to the base 21. The protecting cover 24 can be connected by detachable manners such as clamping, threading, riveting, or plugging.

In some embodiments, the outer interface 25 is mounted on the base 21. The outer interface 25 is electrically connected to a photosensitive member 13 to enable signal transmission between the photosensitive member 13 and the control portion via the outer interface 25.

The above are only exemplary embodiments of this application and are not intended to limit this application. Any modification, equivalent replacement, and improvement made within the spirit and principle of this application shall be included within the protection scope of this application.

When a LiDAR measures a target, the intensity of echo signals of the target changes with the change of distance. For example, the closer the distance, the weaker the echo signals. A main reason for this phenomenon is that the echo signals are shifted when passing through the receiving optical system, and are not fully detected by the receiving sensor. The closer the target, the weaker the intensity of the detecting signals. To tackle the above problems, referring to FIG. 8, embodiments of the present application propose a laser receiving device 100 for correcting the offset of echo signals of a close-range detecting target to improve the intensity of effective signals of a receiving sensor 110.

In some embodiments, the laser receiving device 100 includes the receiving sensor 110 and an optical assembly 120 arranged on a side on which a photosensitive surface 111 of the receiving sensor 110 is located. The receiving sensor 110 is configured to receive echo laser signals and convert the echo laser signals into electric signals. The receiving sensor 110 can be a photodiode or the like. The optical assembly 120 can be configured to refract or otherwise process at least a portion of laser signals reflected back from the close-range detecting target, so that more laser signals can reach the receiving sensor 110, to correct offset generated by the echo signals of the close-range detecting target, and enhance the intensity of the effective signals of the receiving sensor 110.

Referring to FIGS. 8 and 9, the optical assembly 120 can include a first prism 121 having a first end surface 1211, a second end surface 1212, and a plurality of sides connected between the first end surface 1211 and the second end surface 1212. The plurality of sides include a first side 1213 and a second side 1214. At least a portion of the laser signals reflected by the detecting target can be refracted by the first side 1213 and enter the first prism 121. At least a portion of laser signals refracted by the first side 1213 can again be refracted by the second side 1214 and emitted from the first prism 121 to reach the receiving sensor 110. Since the first prism 121 is added in a transmission path of the echo laser signals, and both the first side 1213 and the second side 1214 of the first prism 121 can refract at least a portion of the echo laser signals of the detecting target, echo intensity of the close-range detecting target can be enhanced by using the first prism to correct the offset generated by the echo signals of the close-range detecting target. Moreover, the prism does not obstruct an optical path compared to a plane diffuse mirror, occupies less optical space resources, and can facilitate the tight arrangement of the laser receiving devices 100 and guarantee sufficient intensity of the echo signals of the close-range detecting target. The present application has excellent performance in a multi-wire-beam and small-volume LIDAR 10.

It should be noted that according to different off-axis LiDARs, according to different detecting distance parameters of design, "close distances" that need to be enhanced in a near field are also different. It should be known to the person skilled in the art that regardless of the model of the LiDAR, the optical assembly 120 can be added to the transmission path of the echo laser signals to correct the offset generated by the echo signals of the corresponding close-range detecting target of the LiDAR 10.

Figure 10:
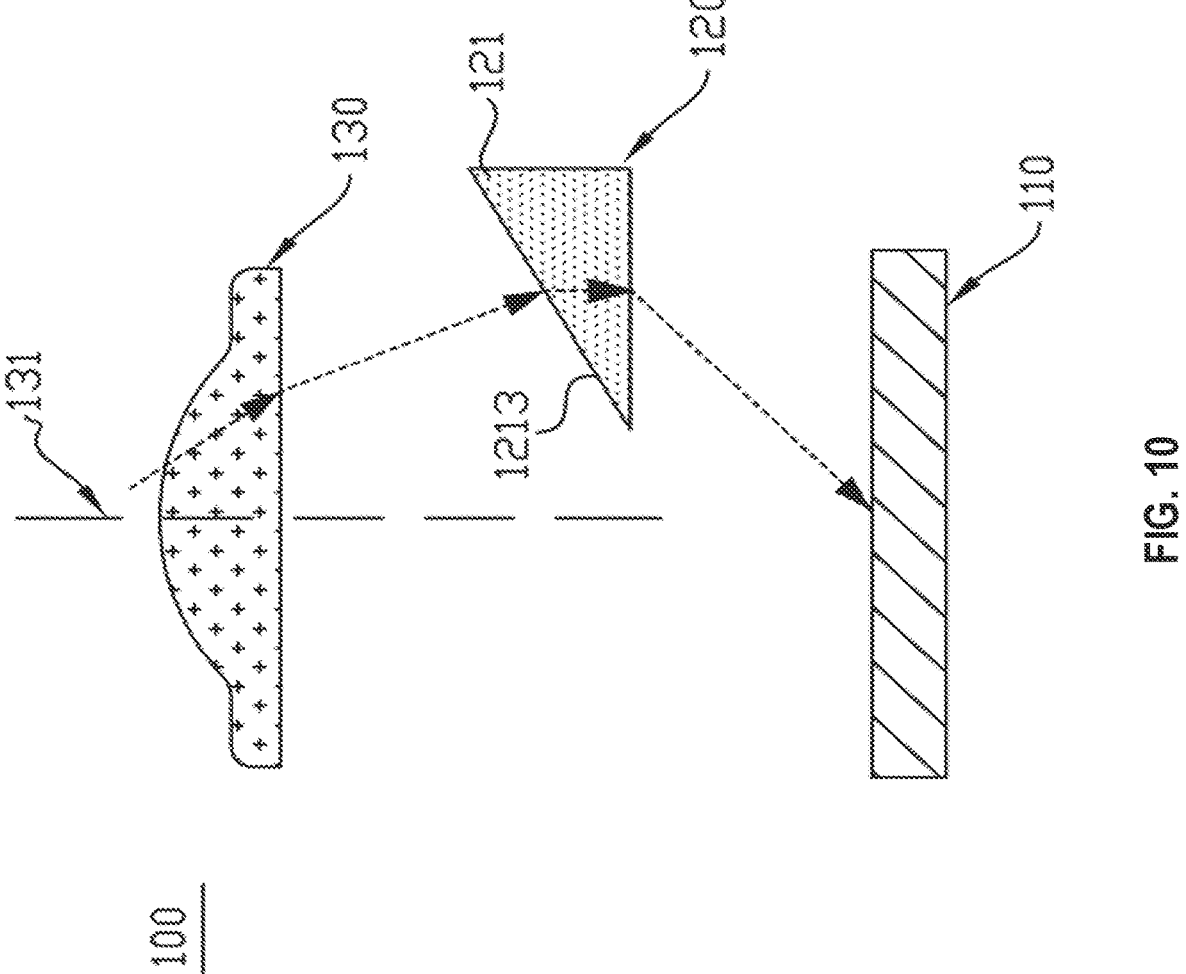
FIG. 10 is a cross-sectional diagram of a second laser receiving device provided in an embodiment of the present application.
Figure 11:
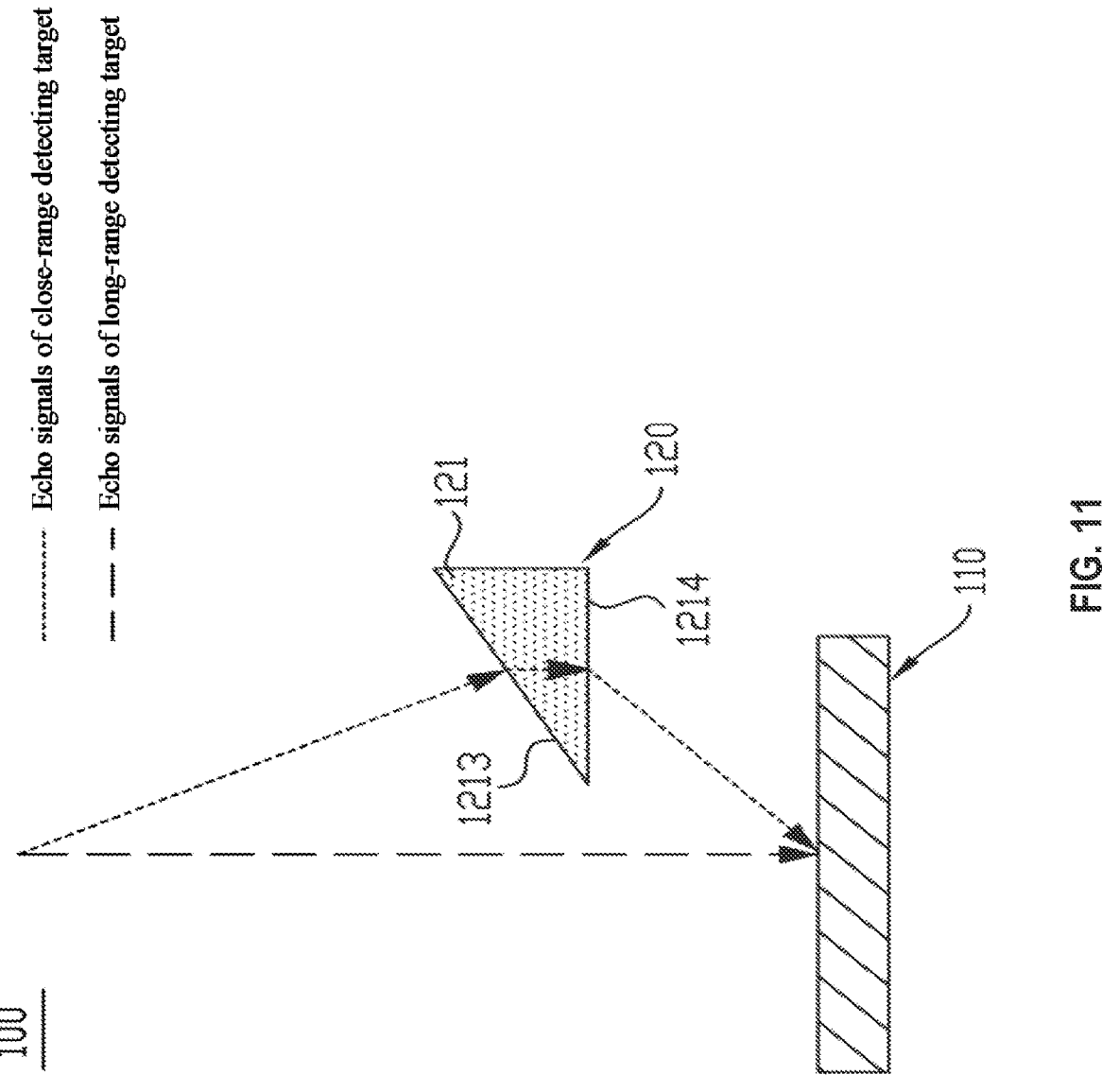
FIG. 11 is an optical path diagram of echo signals of a close-range detecting target and echo signals of a long-range detecting target in a laser receiving device shown in FIG. 10.

In some embodiments, referring to FIG. 10, the laser receiving device 100 can further include a laser receiving lens 130 located on a side on which the first side 1213 of the first prism 121 is located, so that at least a portion of the laser signals reflected back by the target reaches the first side 1213 of the first prism 121 after passing through the laser receiving lens 130. In general, the laser receiving lens 130 can converge and process the echo signals so that the echo signals can be converged to the receiving sensor 110. In particular, for the long-range detecting target, the convergence effect of the laser receiving lens 130 is significant. The echo signals can be more accurately received by the receiving sensor 110. However, for the close-range detecting target, the echo signals are shifted after passing through the laser receiving lens 130, causing the echo signals not be able to be completely detected and received by the receiving sensor 110. Based on this, in some embodiments, all the edge lines of the first prism 121 are perpendicular to the receiving optical axes 131 of the laser receiving lens 130 and are located on the same side as the receiving optical axis 131. When the echo signals of the close-range detecting target pass through the laser receiving lens 130 and are shifted, the offset echo signals can enter the first prism 121 so that the offset echo signals are transmitted to the receiving sensor 110 after being refracted by the first prism 121. The echo signals of the long-range detecting target can reach the receiving sensor 110 directly after passing through the laser receiving lens 130 without deflecting through the first prism 121, see FIG. 11.

An edge line of the first prism 121 is a junction line between two adjacent sides of the first prism 121, such as a junction line between the first side 1213 and the second side 1214. All the edge lines of the first prism 121 can be viewed generally parallel to one another. It should be noted that due to manufacturing error, assembly error, and other factors, it is difficult for all the edge lines of the first prism 121 to be perpendicular to a receiving optical axis 131 of the laser receiving lens 130. Therefore, in actual use, all the edge lines of the first prism 121 are generally perpendicular to the receiving optical axis 131. For example, an included angle between all the edge lines of the first prism 121 and the receiving optical axis 131 is between 85° and 95°, which can be viewed as vertical.

The first prism 121 can be a triangular prism, a tetraprism, a pentaprism, or the like. The following is an exemplary illustration of the triangular prism with simple structure, mature manufacturing process, and low cost. When the first prism 121 is the triangular prism, both the first end surface 1211 and the second end surface 1212 are triangular.

In some embodiments, both the first end surface 1211 and the second end surface 1212 can be rectangular triangles. The first side 1213 can correspond to an oblique edge of the rectangular triangle. When the first end surface 1211 and the second end surface 1212 of the triangular prism are both rectangular triangles, the size of one of the three sides of the triangular prism corresponding to the oblique side of the rectangular triangle is larger, and is used as the first side 1213 of the triangular prism for input of light. An input light amount of the triangular prism can be increased. More offset light rays can be corrected.

Figure 12:
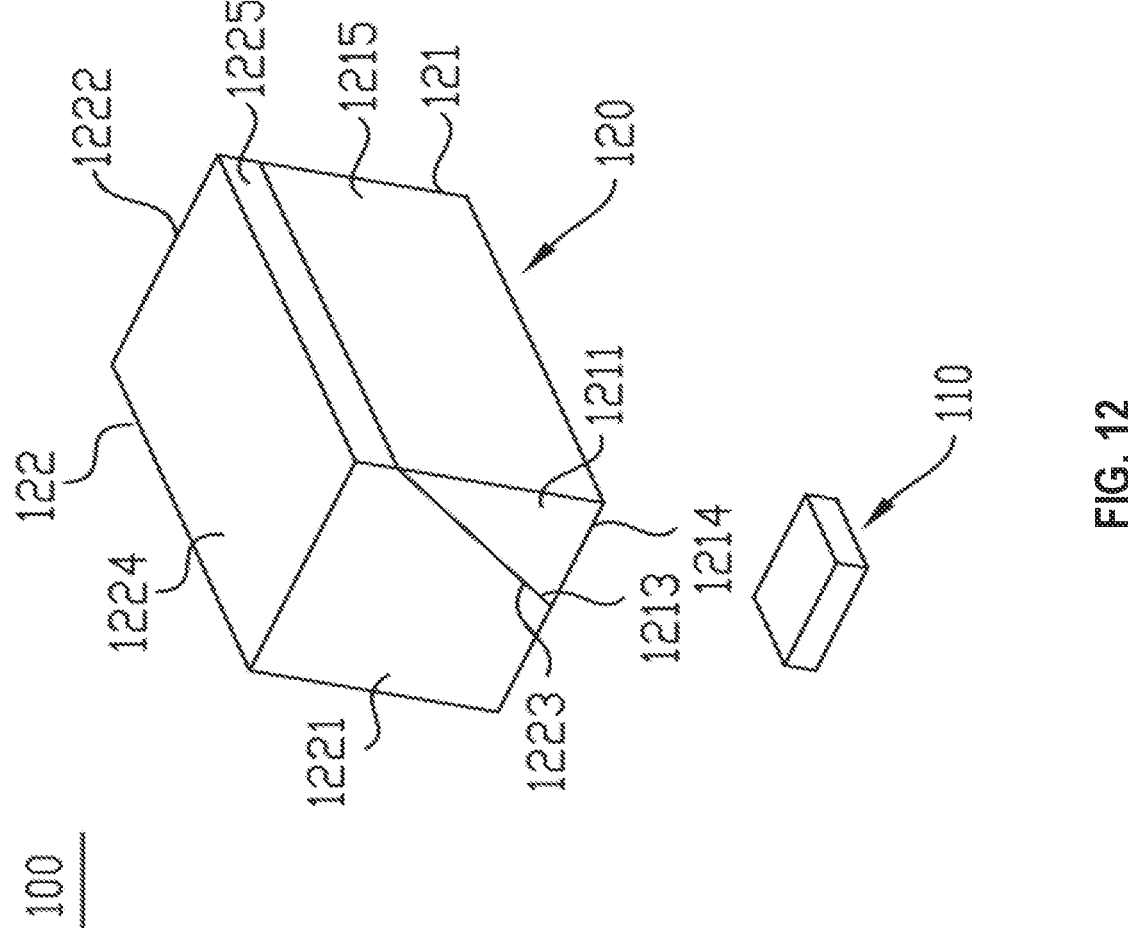
FIG. 12 is a perspective diagram of a third laser receiving device provided in an embodiment of the present application.
Figure 13:
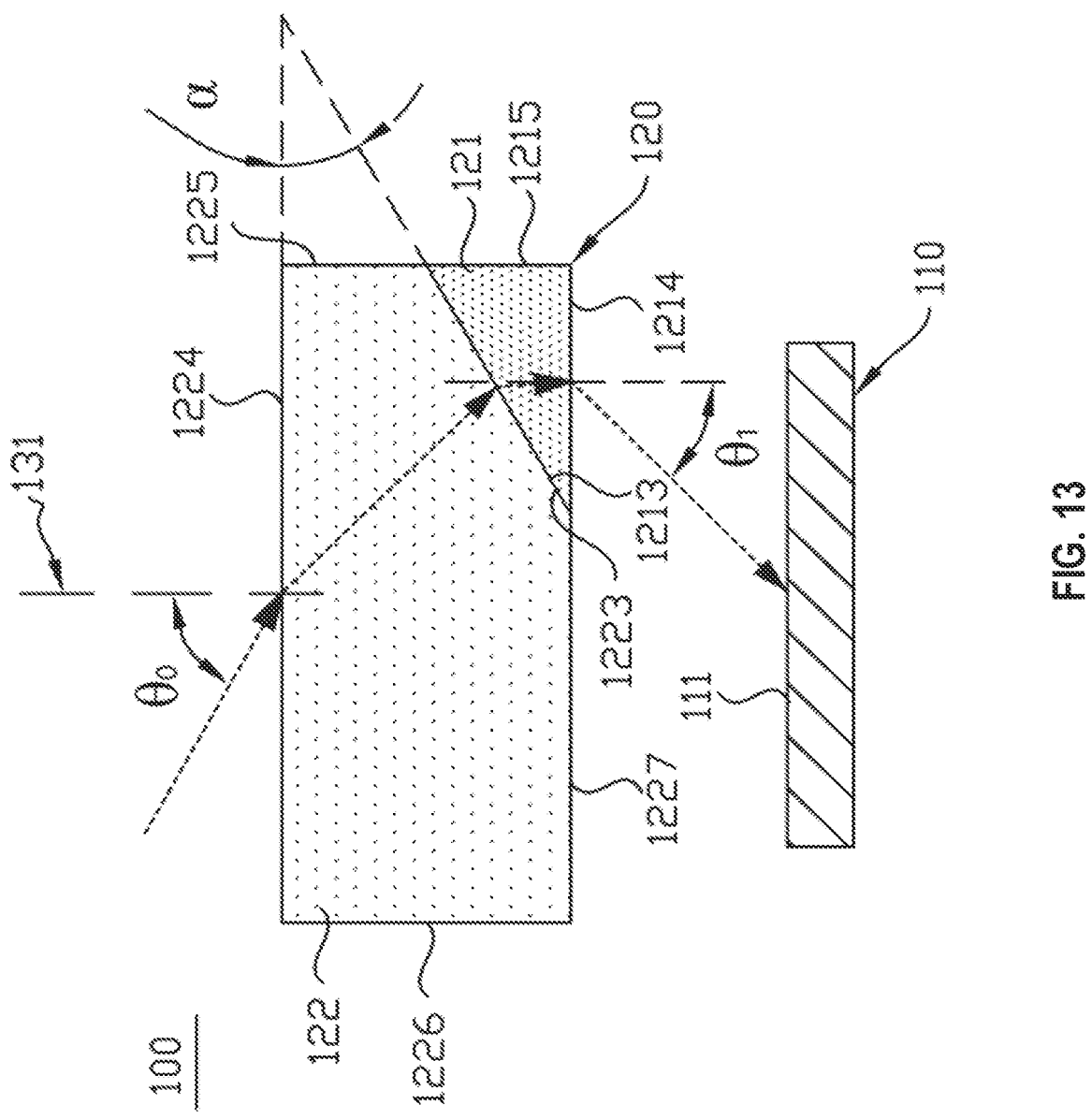
FIG. 13 is a cross-sectional diagram of a laser receiving device shown in FIG. 12.

In some embodiments, referring to FIGS. 12 and 13, the optical assembly 120 can further include a second prism 122. The second prism 122 has a refractive index different from that of the first prism 121. The second prism 122 can be connected to the first prism 121. At least a portion of the laser signals reflected back from the detecting target can enter the first prism 121 via the second prism 122. Since the optical assembly 120 includes the first prism 121 and the second prism 122, a structure of the optical assembly 120 can be organized by combining the first prism 121 and the second prism 122 to facilitate installation within the laser receiving device 100. In some embodiments, the second prism 122 can have a third end surface 1221, a fourth end surface 1222, and a plurality of sides connected between the third end surface 1221 and the fourth end surface 1222. The plurality of sides can include a fourth side 1223 and a fifth side 1224. The fourth side 1223 can be attached to the first side 1213 of the first prism 121. At least a portion of the laser signals reflected back from the close-range detecting target can enter the second prism 122 via the fifth side 1224, and then reach the fourth side 1223, the first side 1213, and the second side 1214.

Figure 14:
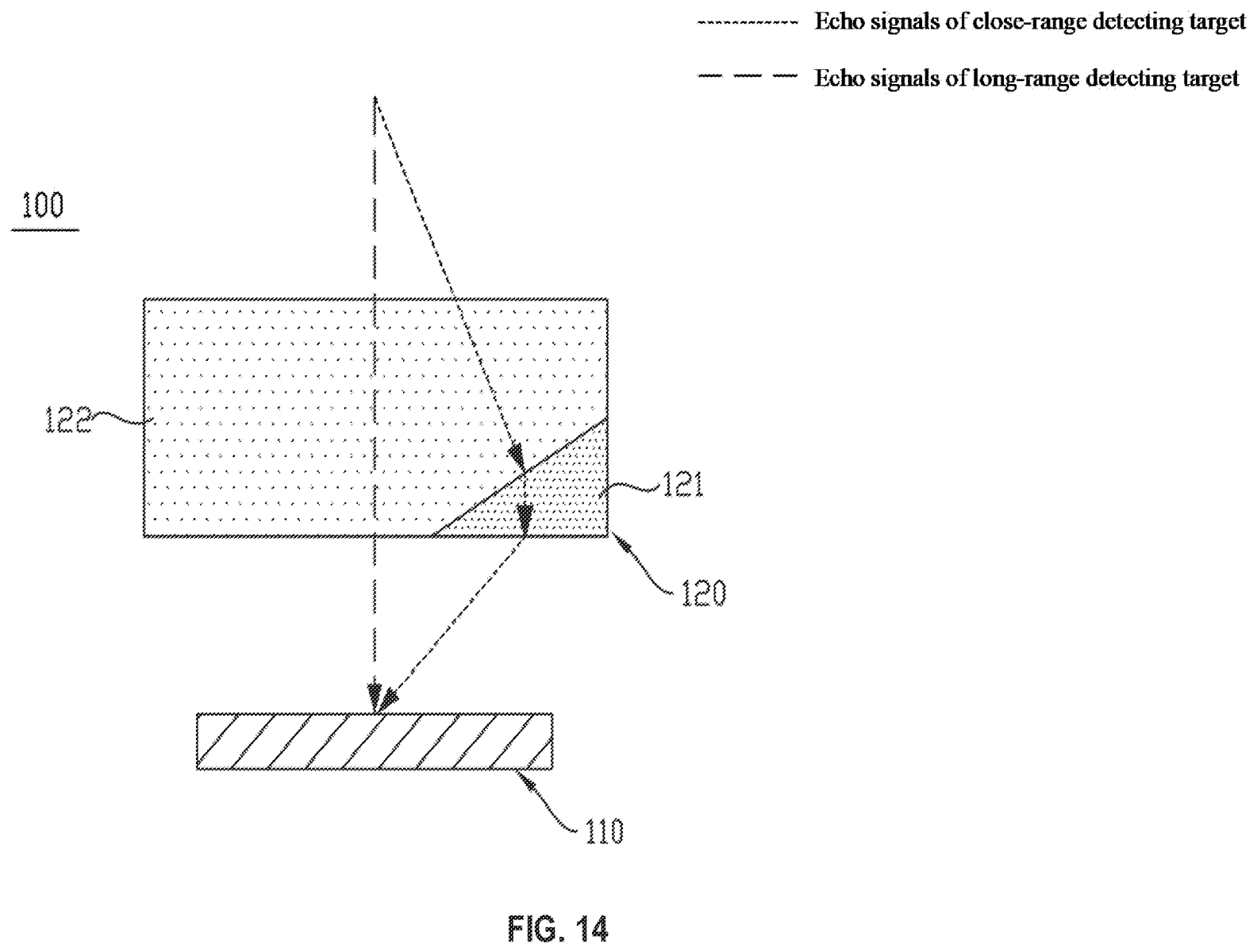

It should be noted that the second prism 122 can refract a light ray passing through the second prism, as shown in FIG. 13. The second prism 122 can also directly pass the light without refracting the light ray passing through the second prism, as shown in FIG. 14, which can be flexibly adjusted in production and manufacturing processes in accordance with actual needs. Whether the second prism 122 has a refractive effect on the light passing through the second prism 122 can be achieved by changing a refractive index of the second prism 122. For example, making the refractive index of the environment in which the light enters the second prism 122 be different from the refractive index of the second prism 122, to realize the refraction of the light after entering the second prism 122; making the refractive index of the environment in which the light enters the second prism 122 be substantially the same as the refractive index of the second prism 122, to realize that the light is directly transmitted with little refraction after entering the second prism 122.

When the second prism 122 is capable of refracting the light ray passing through the second prism, that is, when both the first prism 121 and the second prism 122 have a refractive effect on the echo signals of the close-range detecting target, an included angle between surfaces of the first prism 121 and the second prism 122 that have a refractive effect on the light can be correspondingly adjusted so that the echo signals are more accurately received by the receiving sensor 110. The intensity of the effective signals of the receiving sensor 110 can be improved. When the second prism 122 directly passes the light without refracting the light ray passing through the second prism, by adjusting contours of the first prism 121 and the second prism 122, the first prism 121 and the second prism 122 can be combined to form a regular structure, for example, form a rectangular shape or the like, so as to facilitate installation of the optical assembly 120.

In some embodiments, referring again to FIGS. 12 and 13, when the first prism 121 is the triangular prism, the second prism 122 can be the pentaprism. The plurality of sides of the second prism 122 can further include a sixth side 1225, a seventh side 1226, and an eighth side 1227. The fourth side 1223, the sixth side 1225, the fifth side 1224, the seventh side 1226, and the eighth side 1227 can be sequentially connected. The sixth side 1225 can be perpendicular to the fifth side 1224. The fifth side 1224 can be perpendicular to the seventh side 1226. The seventh side 1226 can be perpendicular to the eighth side 1227. The eighth side 1227 can be flush with the second side 1214 of the first prism 121. The sixth side 1225 can be flush with the third side 1215 of the first prism 121. The third end surface 1221 can be flush with the first end surface 1211 of the first prism 121. The fourth end surface 1222 can be flush with the second end surface 1212 of the first prism 121 such that the first prism 121 and the second prism 122 can be combined to form a rectangular shape.

Further, in some embodiments, the fifth side 1224 can be perpendicular to a receiving optical axis 131. In this case, the flat eighth side 1227 and the second side 1214 that are flush with each other are also perpendicular to the receiving optical axis 131. In general, the photosensitive surface 111 of the receiving sensor 110 is also perpendicular to the receiving optical axis 131, so that the optical assembly 120 and the receiving sensor 110 are neatly arranged, which is conducive to calculating an optimal angle state of the first side 1213 of the first prism 121. For example, in this case, an included angle $\theta_0$ between a light ray incident on the fifth side 1224 of the second prism 122 and the receiving optical axis 131, an included angle $\alpha$ between the first side 1213 and the fifth side 1224 of the first prism 121, and an included angle $\theta_1$ between the second side 1214 of the first prism 121 and the receiving optical axis 131 can satisfy the following equation:

23

$$\theta_1 = \arcsin\left(\frac{\sin\left(\arcsin\left(\frac{n_1}{n_2}\sin\left(\alpha - \arcsin\left(\frac{\sin\theta_0}{n_1}\right)\right)\right) - \alpha\right)\right)}{n_2}\right),$$

where $n_1$ is a refractive index of the first prism 121, and $n_2$ is a refractive index of the second prism 122. $\theta_0$ is related to a distance of the LiDAR 10. For example, the close-range detecting targets required by a portion of the LiDAR 10 are detecting targets within a distance of 15 m. The value range of $\theta_0$ can be determined roughly according to a specific numerical range of the close-range detecting target of the LiDAR 10. $\theta_1$ is related to a relative position between the first prism 121 and the receiving sensor 110 within the laser receiving device 100. The value range of $\theta_1$ can be roughly determined according to a placement position of the first prism 121 and the receiving sensor 110. The included angle $\alpha$ between the first side 1213 and the fifth side 1224 of the first prism 121 can be roughly calculated when $\theta_0$, $\theta_1$, $n_1$, and $n_2$ are all known.

It can be seen from the above equation that a combination form of the first prism 121 and the second prism 122 is not unique. By adjusting parameters of $\theta_0$, $\theta_1$, $n_1$, $n_2$, and $\alpha$, the combination form can be obtained to meet refracting deflection requirements. Therefore, the present application has the advantage of not being easily limited by a material of the prism, and has wide applicability.

Figure 15:
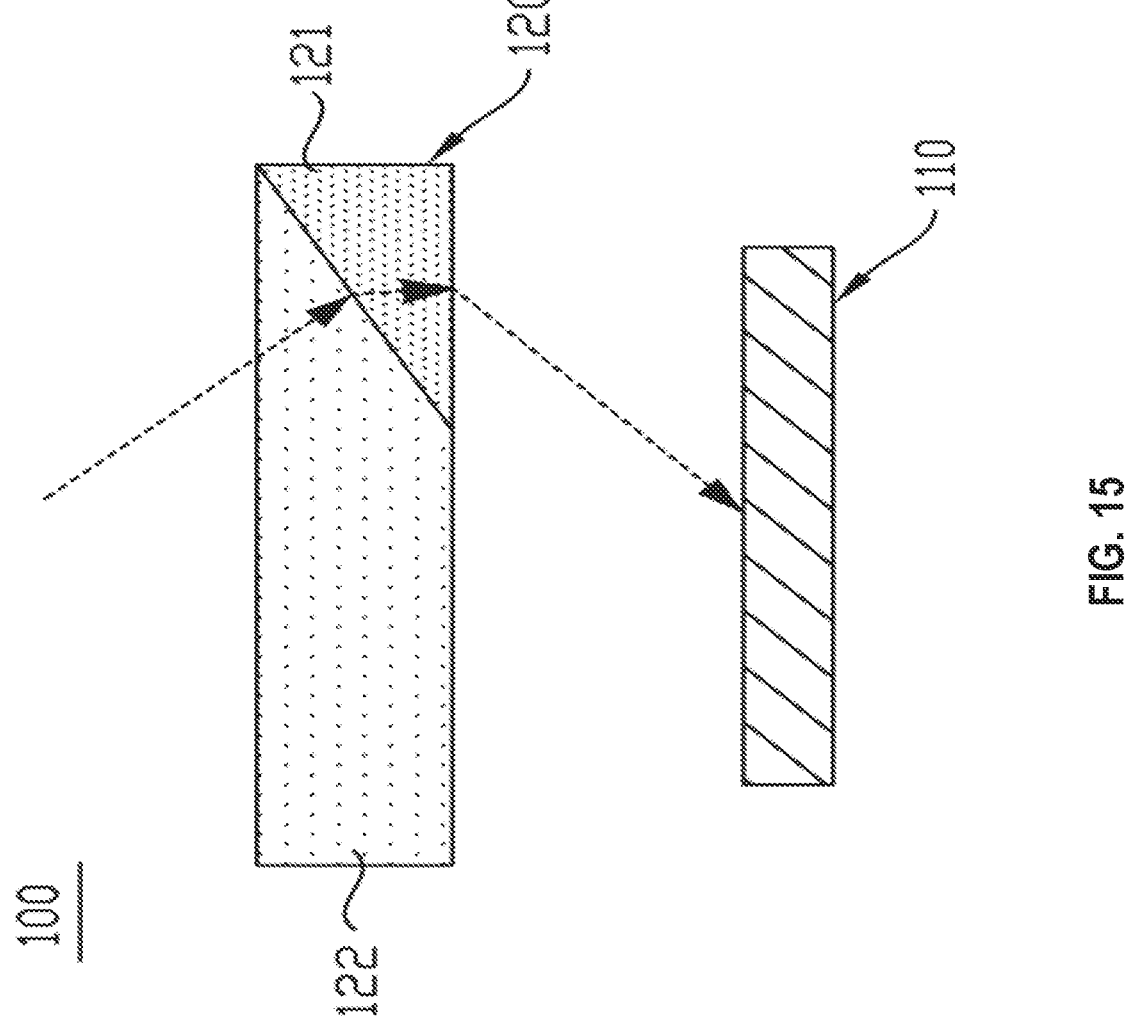
FIG. 15 is a cross-sectional diagram of a fourth laser receiving device provided in an embodiment of the present application.

It should be noted that the second prism 122 can be the tetraprism having four sides or the like, in addition to the pentaprism recorded above. Combining the second prism 122 with the first prism 121 enables the formation of a regular structure. For example, referring to FIG. 15, when the second prism 122 is the tetraprism, the second prism 122 and the first prism 121 can also be combined to form a rectangular shape. The present application does not define the shape of the second prism 122.

In some embodiments, if the projection of the optical assembly 120 on the photosensitive surface 111 of the receiving sensor 110 is defined as a first projection, the first projection can include a first region corresponding to the photosensitive surface 111 and a second region arranged at a periphery of the first region so that the echo signals pass through the optical assembly 120 as far as possible before reaching the photosensitive surface 111. Additionally, the optical assembly 120 located on an outer side can also serve as a better protection for the receiving sensor 110 on an inner side.

It should be noted that in addition to the first prism 121 and the second prism 122 described above, the optical assembly 120 can also include a third prism, a fourth prism, and so on located on a transmission path of the echo signals, so that the echo signals of the close-range detecting target can be refracted by the plurality of prisms. The embodiments of the present application do not define the specific number of prisms included in the optical assembly 120.

Referring again to FIG. 14, the size of the first prism 121 in the optical assembly 120 is related to a distance of a close-range detecting target required by the LiDAR 10, so that the echo signals of a portion of the close-range detecting targets can be deflected via the first prism 121 and enter a detecting range of the receiving sensor 110. A size of the second prism 122 in the optical assembly 120 is related to a distance of a long-range detecting target required by the LiDAR 10 to ensure that the echo signals of a vast majority of the long-range detecting targets can pass smoothly through the second prism 122 rather than through the first prism 121.

The first prism 121 and the second prism 122 can be connected by a gluing manner. A gluing connection manner is simple and allows for non-destructive connection of the first prism 121 and the second prism 122. It should be noted that the first prism 121 and the second prism 122 can also be connected by other means, which is not defined in the embodiments of the present application.

Figure 16:
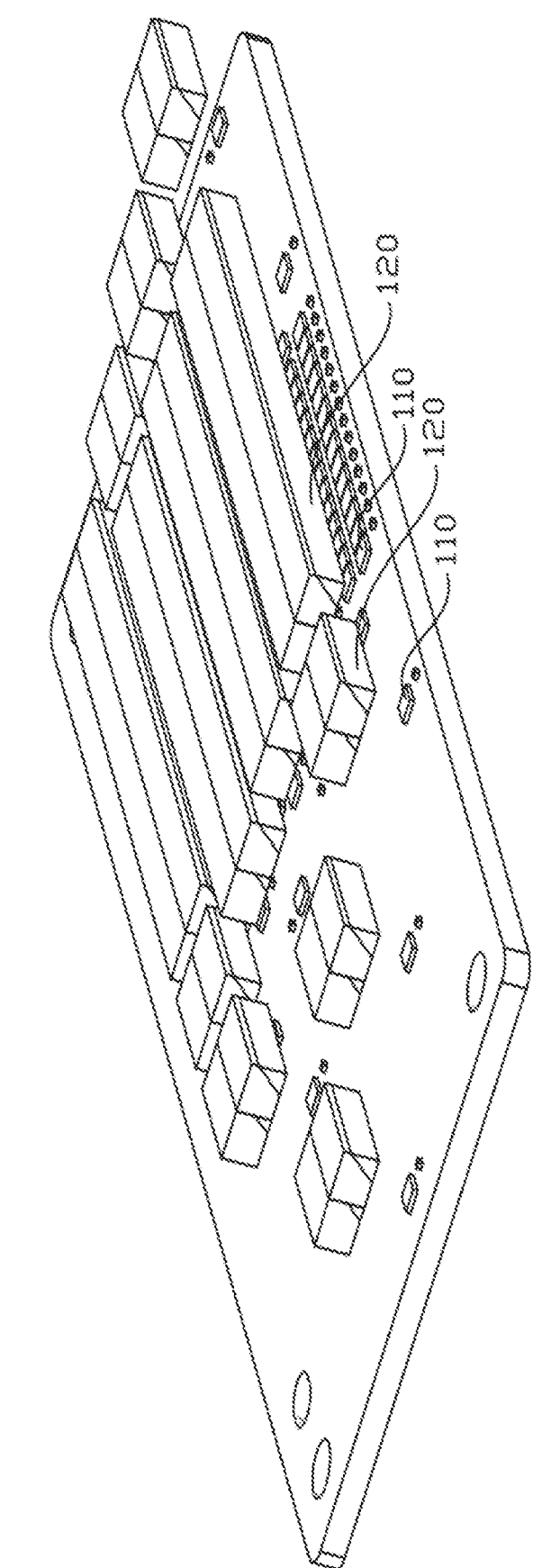
FIG. 16 is a perspective diagram of a fifth laser receiving device provided in an embodiment of the present application.

Referring to FIG. 16, the laser receiving device 100 can include a plurality of receiving sensors 110 and a plurality of optical assemblies 120. The receiving sensors 110 can has the number equal to that of the optical assemblies 120. The receiving sensors 110 and the optical assemblies 120 are arranged one-on-one. Therefore, each of the optical assemblies 120 can correct the echo signal offset at the corresponding receiving sensor 110 to enhance overall intensity of the detecting signals of the laser receiving device 100.

Figure 17:
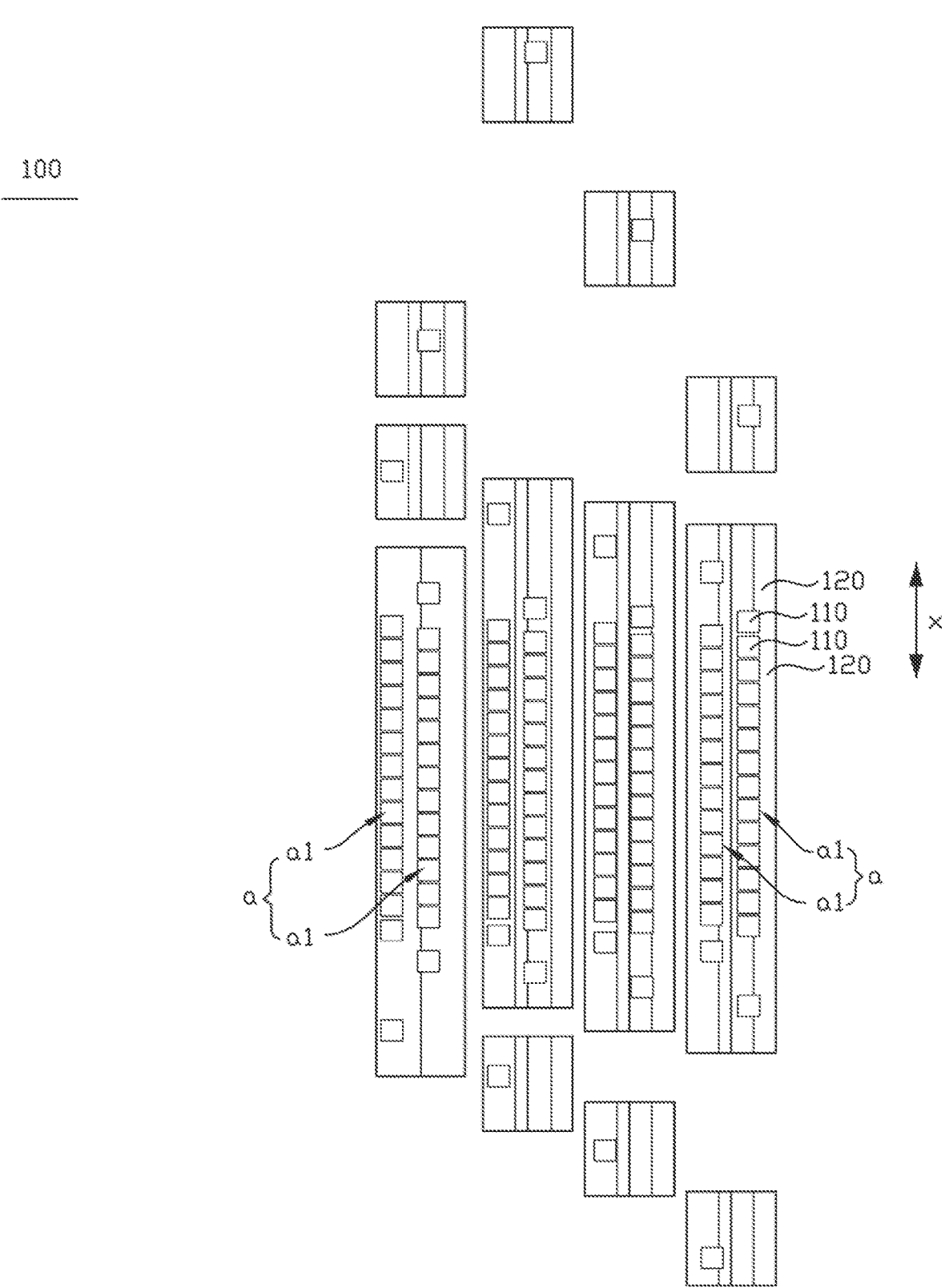
FIG. 17 is a top diagram of a receiving sensor and an optical assembly in a laser receiving device shown in FIG. 16.

In some embodiments, referring to FIG. 17, the plurality of receiving sensors 110 can be divided into at least one receiving sensor unit a1. Each of the receiving sensor units a1 can include the plurality of receiving sensors 110 distributed at intervals along a first direction x. The first direction x can be parallel to an edge line direction of the first prism 121. In this case, the optical assemblies 120 corresponding to at least two of the adjacent receiving sensors 110 within the same receiving sensor unit a1 can be connected as a whole. Connecting the optical assemblies 120 corresponding to at least two of the adjacent receiving sensors 110 as a whole can simplify an assembly process and increase assembly efficiency as compared to an independent arrangement of each of the optical assemblies 120.

The plurality of receiving sensors 110 within each of the receiving sensor unit a1 can be distributed at equal intervals along the first direction x. In the plurality of receiving sensors 110 within each of the receiving sensor units a1, a portion of the receiving sensors can also be distributed at equal intervals along the first direction x. In the plurality of receiving sensors 110 within each of the receiving sensor units a1, the optical assemblies 120 corresponding to a portion of the receiving sensors 110 distributed at equal intervals along the first direction x can be connected as a whole.

In some embodiments, the plurality of receiving sensors 110 can be divided into more than two receiving sensor units a1. The two adjacent receiving sensor units a1 can be combined to form one receiving sensor group a. The plurality of receiving sensors 110 can be divided into the plurality of receiving sensor groups a. In this case, the plurality of receiving sensors 110 within each of the receiving sensor units a1 can be serialized. The two receiving sensor units a1 within each of the receiving sensor groups a can be electrically connected in a one-to-one manner with amplifier groups of the laser receiving device 100 and the like after being connected in parallel. In this way, each of the receiving sensor units a1 forms an electric closed loop, and a mode of operation is a serial mode. The two receiving sensor units a1 in each of the receiving sensor groups a are operated in a parallel manner and are independent of each other. The two receiving sensor units a1 in the receiving sensor group a can be electrically isolated, thereby effectively and significantly reducing electric serial disturbance of each other, optimizing a signal-to-noise ratio, and improving the accuracy of laser detection.

Further, in some embodiments, in the two receiving sensor units a1 within the same receiving sensor group a, the optical assemblies 120 corresponding to at least one of the receiving sensors 110 within one receiving sensor unit a1 can be integrated with the optical assemblies 120 corresponding to the adjacent receiving sensors 110 within the other receiving sensor unit a1. In this way, an assembly process of the plurality of optical assemblies 120 in the two adjacent receiving sensor units a1 can be simplified to improve assembly efficiency.

In some embodiments, the laser receiving device 100 can include 128 receiving sensors 110 and 128 optical assemblies 120. The 128 receiving sensors 110 can be divided into eight receiving sensor units a1. Each of the receiving sensor units a1 can include 16 receiving sensors 110. The eight receiving sensor units a1 can in turn be divided into four receiving sensor groups a. Each receiving sensor group a can include two receiving sensor units a1.

For example, the four receiving sensor groups a can be recorded as a first receiving sensor group, a second receiving sensor group, a third receiving sensor group, and a fourth receiving sensor group, respectively. The two receiving sensor units a1 included in the first receiving sensor groups can be recorded as a first receiving sensor unit and a second receiving sensor unit. The two receiving sensor units a1 included in the second receiving sensor group can be recorded as a third receiving sensor unit and a fourth receiving sensor unit. The two receiving sensor units a1 included in the third receiving sensor group can be recorded as a fifth receiving sensor unit and a sixth receiving sensor unit. The two receiving sensor units a1 included in the fourth receiving sensor group can be recorded as a seventh receiving sensor unit and an eighth receiving sensor unit. The first receiving sensor unit, . . . , the eighth receiving sensor unit can all include the first receiving sensor, the second receiving sensor, . . . , an eighth receiving sensor.

The optical assemblies 120 corresponding to at least two of the adjacent receiving sensors 110 within the same receiving sensor unit a1 described above can be integrated as follows: the optical assembly 120 corresponding to the first receiving sensor within the first receiving sensor unit and the optical assembly 120 corresponding to the second receiving sensor are connected as a whole. In some embodiments, the optical assembly 120 corresponding to the second receiving sensor within the first receiving sensor unit is integrated as a whole with the optical assembly 120 corresponding to a third receiving sensor, the optical assembly 120 corresponding to a fourth receiving sensor, the optical assembly 120 corresponding to a fifth receiving sensor, and the optical assembly 120 corresponding to a sixth receiving sensor.

For the two receiving sensor units a1 in the same receiving sensor group a1 described above, the optical assembly 120 corresponding to at least one of the receiving sensors 110 in one receiving sensor unit a1 is connected to the optical assembly 120 corresponding to the adjacent receiving sensor 110 of the other receiving sensor unit a1 as a whole. That is, within the first receiving sensor group, the optical assembly 120 corresponding to the fifth receiving sensor of the first receiving sensor unit is connected to the optical assembly 120 corresponding to the fifth receiving sensor of the second receiving sensor unit as a whole. In some embodiments, within the first receiving sensor group, the optical assembly 120 corresponding to the fourth receiving sensor of the first receiving sensor unit, the optical assembly 120 corresponding to the fifth receiving sensor, and the optical assembly 120 corresponding to the sixth receiving sensor are all connected to the optical assembly 120 corresponding to the fourth receiving sensor of the second receiving sensor unit, the optical assembly 120 corresponding to the fifth receiving sensor, and the optical assembly 120 corresponding to the sixth receiving sensor as a whole.

Figure 18:
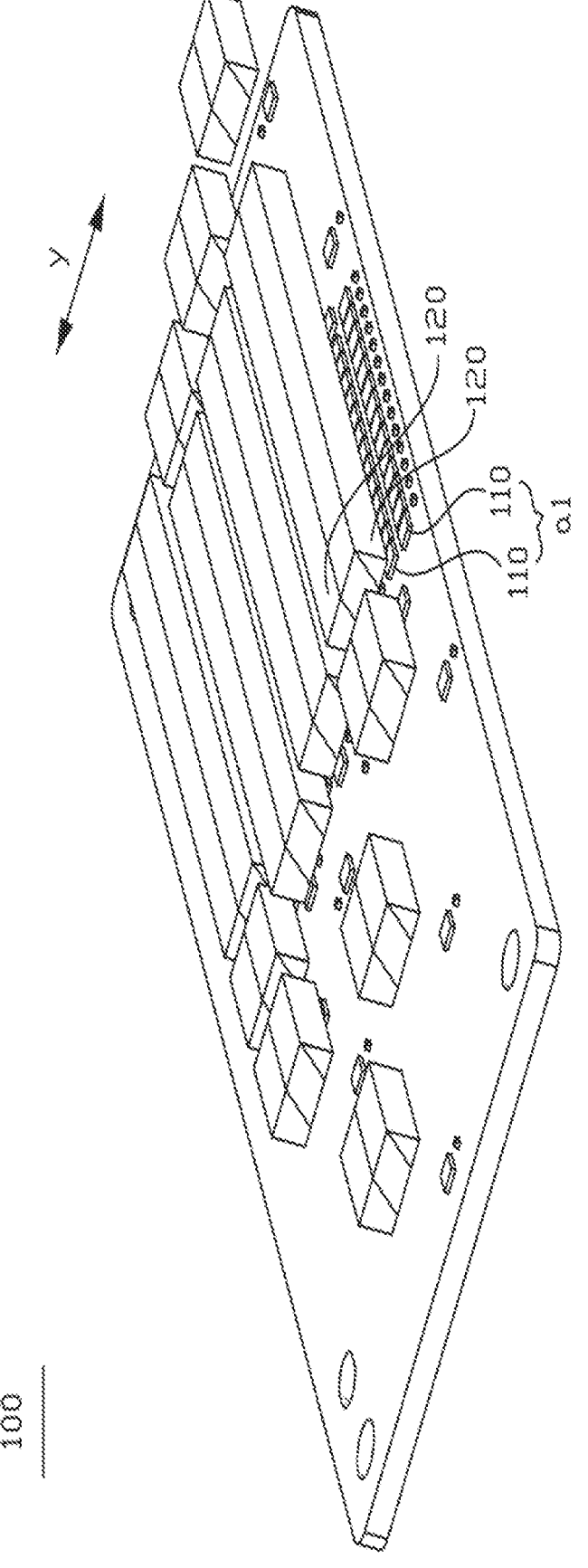
FIG. 18 is a perspective diagram of a sixth laser receiving device provided in an embodiment of the present application.

Referring to FIG. 18, which is a perspective diagram of a sixth laser receiving device provided in an embodiment of the present application. FIG. 18 is distinct from FIG. 17. In FIG. 17, the receiving sensor unit a1 includes the plurality of receiving sensors 110 distributed at intervals along the first direction x. In FIG. 18, the receiving sensor unit a1 is modified to include the plurality of receiving sensors 110 distributed at intervals along a second direction y, and the second direction y is perpendicular to the edge line direction of the first prism 121. In this case, the optical assemblies 120 corresponding to at least two of the adjacent receiving sensors 110 within the same receiving sensor unit a1 can be connected as a whole, which simplifies the assembly process and increases assembly efficiency as compared to the independent arrangement of each of the optical assemblies 120.

Figure 19:
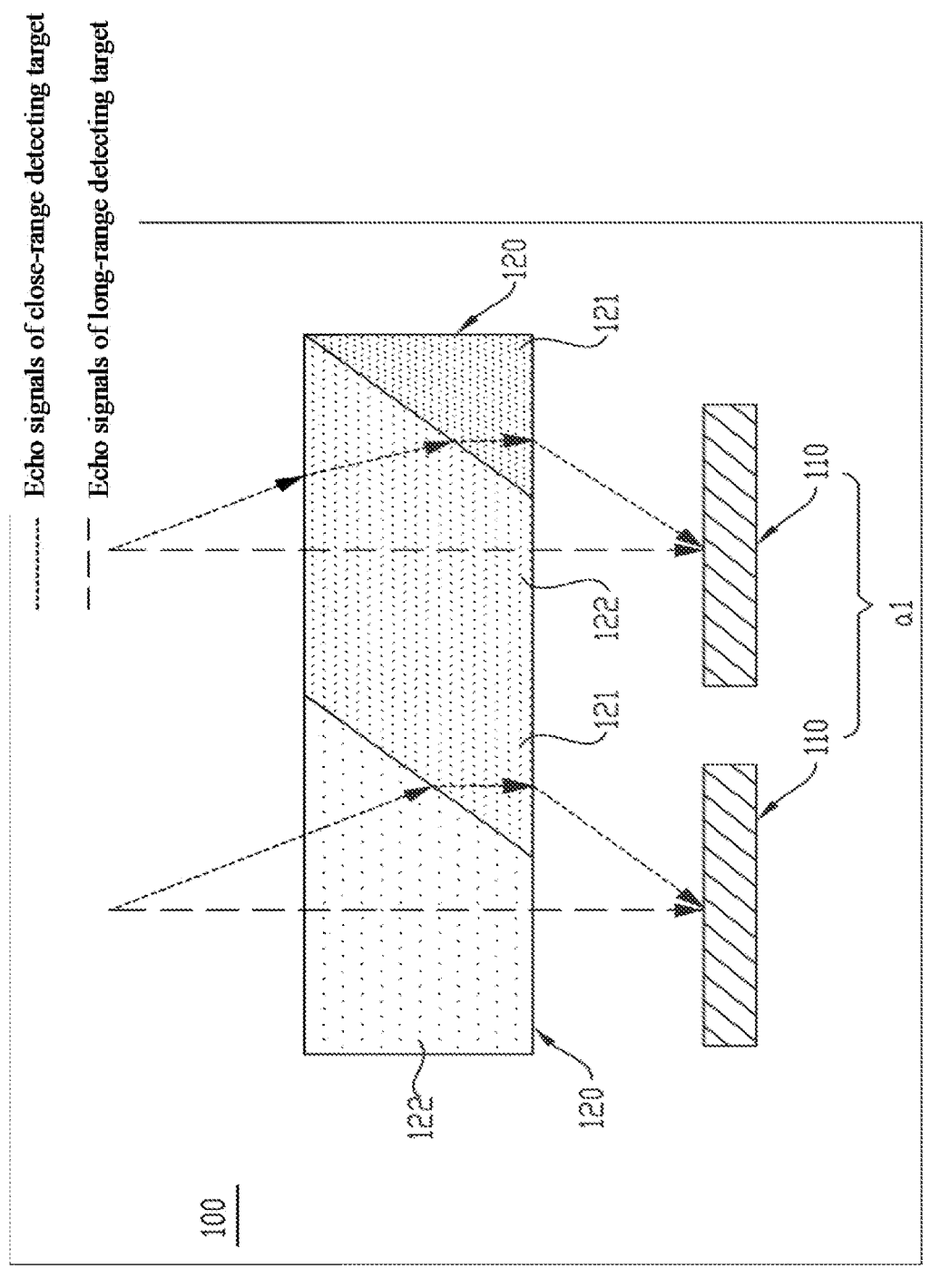
FIG. 19 is an optical path diagram of echo signals of a close-range detecting target and echo signals of a long-range detecting target of two adjacent receiving sensors in a laser receiving device shown in FIG. 18.
Figure 20:
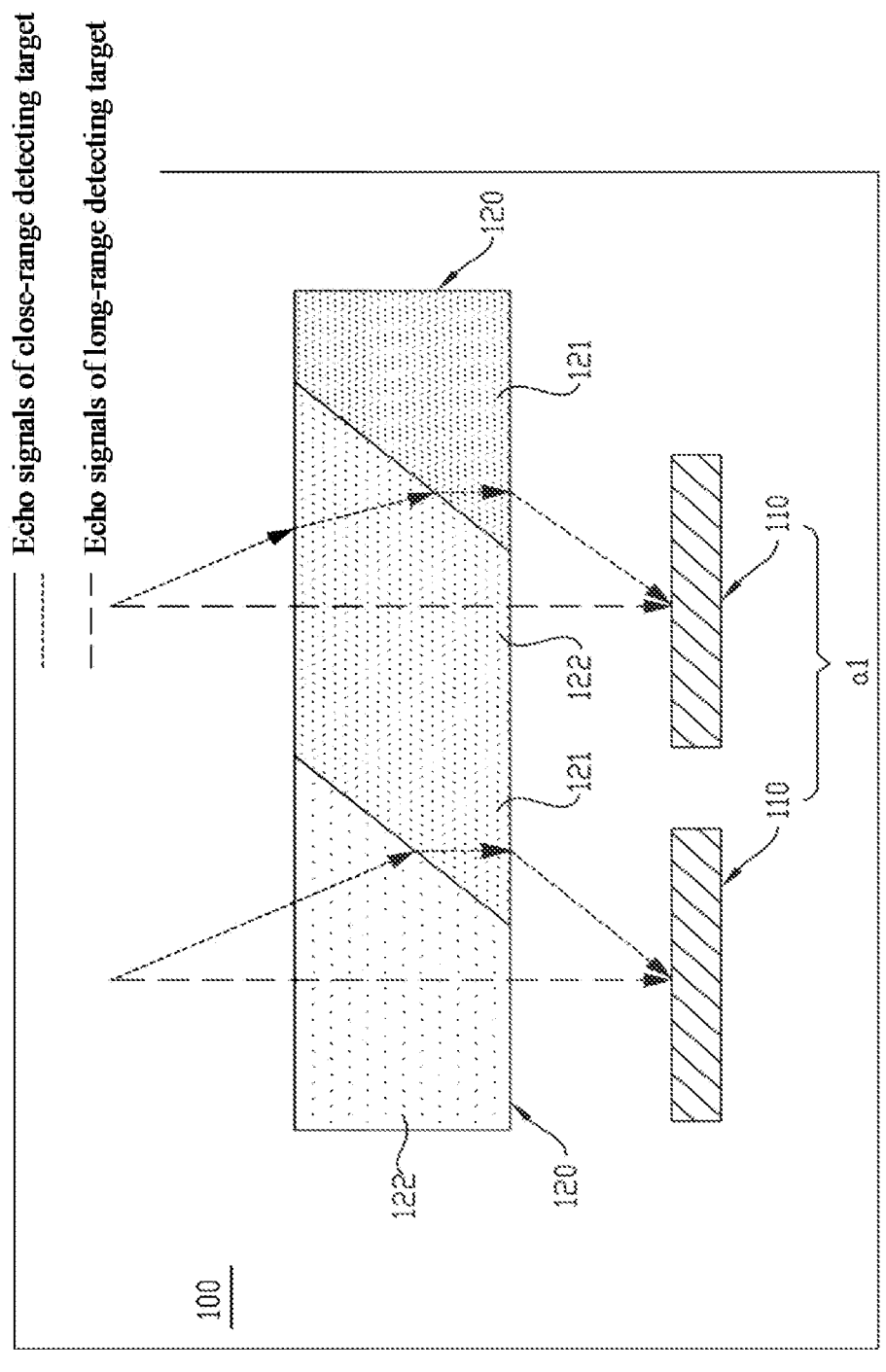
FIG. 20 is an optical path diagram of echo signals of a close-range detecting target and echo signals of a long-range detecting target in a replaceable solution of two adjacent receiving sensors in a laser receiving device shown in FIG. 18.

Further, in some embodiments, referring to FIGS. 19 and 20, within the same receiving sensor unit a1, the first prism 121 of the optical assembly 120 corresponding to at least one receiving sensor 110 can share the same prism with the second prism 122 of the optical assembly 120 corresponding to the adjacent receiving sensors 110. In this way, the number of prisms can be reduced, which simplifies the assembly process and improves the assembly efficiency.

Figure 21:
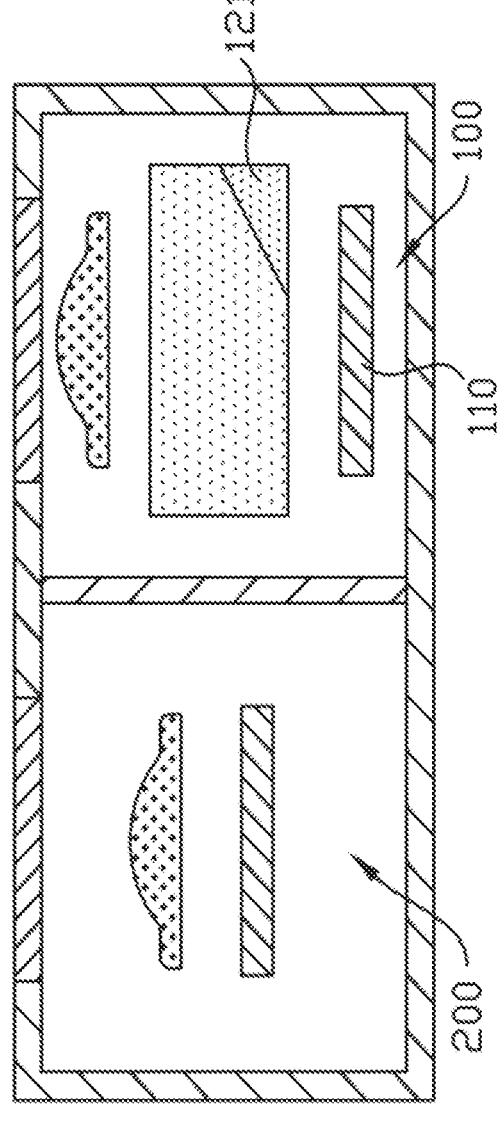
FIG. 21 is a cross-sectional diagram of a LiDAR provided in an embodiment of the present application.

In a second aspect, referring to FIG. 21, an embodiment of the present application provides a LiDAR 10. The LiDAR 10 can include a laser emitting device 200 and a laser receiving device 100 described above. A first prism 121 within the laser receiving device 100 can be located on a side of a receiving sensor 110 away from the laser emitting device.

In some embodiments, LiDAR 10 has the effect of being able to facilitate tight arrangement of the laser receiving device 100 and guarantee sufficient intensity of echo signals of a close-range detecting target at the same time. The present application has excellent performance in a multiwire-beam and small-volume LIDAR 10.

The disclosed forgoing are only some embodiments of this application, which cannot be used to limit the scope of rights of this application. Therefore, equivalent changes made in accordance with the claims of this application still fall within the scope of the application.

What is claimed is:

1. An optical receiving device, comprising:
a receiving sensor; and
an optical assembly arranged on a side where a photosensitive surface of the receiving sensor is located,
wherein the optical assembly comprises a first prism, the first prism has a first end surface, a second end surface, and a plurality of sides connected between the first end surface and the second end surface, and the plurality of sides include a first side and a second side,
wherein at least a portion of laser signals reflected by a detecting target is refracted by the first side and enter the first prism, and at least a portion of laser signals refracted by the first side is refracted by the second side and emitted from the first prism to reach the receiving sensor;
wherein the optical assembly further comprises a second prism having a refractive index different from a refractive index of the first prism, the second prism has a third end surface, a fourth end surface, and a plurality of sides connected between the third end surface and the fourth end surface, and wherein the plurality of sides includes a fourth side and a fifth side, the fourth side is attached to the first side of the first prism, and at least a portion of the laser signals reflected by the detecting target enters the second prism via the fifth side, and then reaches the fourth side, the first side of the first prism, and the second side of the first prism;

wherein the laser receiving device comprises a plurality of receiving sensors and a plurality of optical assemblies, and a number of receiving sensors is equal to that of the optical assemblies; and wherein the plurality of receiving sensors are divided into at least one receiving sensor unit, each of the receiving sensor units comprises the plurality of receiving sensors distributed at intervals along a first direction, and the first direction is parallel to an edge line direction of the first prism, wherein the optical assemblies corresponding to at least two adjacent receiving sensors within the same receiving sensor unit are connected together.

2. The optical receiving device according to claim 1, wherein a laser receiving lens is arranged on a side where the first side of the first prism is located, so that at least a portion of the laser signals reflected back by the detecting target reach the first side of the first prism via the laser receiving lens.

3. The optical receiving device according to claim 2, wherein all edge lines of the first prism are perpendicular to a receiving optical axis of the laser receiving lens and are located on a same side of the receiving optical axis, wherein a reference plane where the receiving optical axis lies is arranged on one side of the first prism.

4. The optical receiving device according to claim 1, wherein the first prism is a triangular prism, and the first end surface and the second end surface are both triangular.

5. The optical receiving device according to claim 4, wherein the first end surface and the second end surface are both rectangular triangles, and the first side corresponds to an oblique edge of the rectangular triangle.

6. The optical receiving device according to claim 1, wherein at least a portion of the laser signals reflected back by the detecting target enters the second prism directly via the fifth side.

7. The control circuit according to claim 1, further comprising:

a voltage source, connected to the switch circuit and configured to: output a high-level control voltage to the switch circuit during the power failure of the galvanometer motor, and output a low-level control voltage to the switch circuit when the galvanometer motor is powered on.

8. The optical receiving device according to claim 1, wherein the plurality of receiving sensors are divided into at least one receiving sensor unit, each of the receiving sensor units comprises the plurality of receiving sensors distributed at intervals along a second direction, and the second direction is perpendicular to an edge line direction of the first prism, wherein the optical assemblies corresponding to at least two adjacent receiving sensors within the same receiving sensor unit are connected together.

9. The optical receiving device according to claim 8, wherein within the same receiving sensor unit, the first prism in the optical assembly corresponding to at least one of the receiving sensors and the second prism in the optical assemblies corresponding to the adjacent receiving sensors are formed as an integral optical assembly.

* * * * *